(12) United States Patent  
Gillanders

(10) Patent No.: US 8,399,813 B2
(45) Date of Patent: Mar. 19, 2013

(54) PORTABLE HEATING APPARATUS FOR HEATING INTERIOR PIPING SYSTEMS

(75) Inventor: Larry Gillanders, Chilliwack (CA)

(73) Assignee: Pipe Restoration Technologies, LLC, Las Vegas, NV (US)

( * ) Notice: Subject to any disclaimer, the term of this patent is extended or adjusted under 35 U.S.C. 154(b) by 747 days.

(21) Appl. No.: 12/571,561

(22) Filed: Oct. 1, 2009

(65) Prior Publication Data

US 2010/0096384 A1 Apr. 22, 2010

Related U.S. Application Data

(60) Continuation-in-part of application No. 12/378,670, filed on Feb. 18, 2009, now Pat. No. 8,206,783, which is a continuation-in-part of application No. 11/946,107, filed on Nov. 28, 2007, and a continuation-in-part of application No. 11/649,647, filed on Jan. 4, 2007, now Pat. No. 7,858,149, which is a continuation-in-part of application No. 11/246,825, filed on Oct. 7, 2005, now Pat. No. 7,517,409, which is a division of application No. 10/649,288, filed on Aug. 23, 2003, now Pat. No. 7,160,574.

(60) Provisional application No. 60/406,602, filed on Aug. 28, 2002.

(51) Int. Cl.
*H05B 3/06* (2006.01)
*H05B 3/58* (2006.01)

(52) U.S. Cl. ...................................... 219/533; 219/535

(58) Field of Classification Search ........... 219/533–553
See application file for complete search history.

(56) References Cited

U.S. PATENT DOCUMENTS 1,890,164 A 12/1932 Rosenberger
(Continued)

FOREIGN PATENT DOCUMENTS

CA 2775699 10/2009
DE 3821558 12/1989
(Continued)

OTHER PUBLICATIONS

American Pipe Lining, Inc., In-place pipe restoration, 9 pages, Mar. 9, 2001, [online], [ retrieved on Oct. 25, 2005], retrieved from the internet: <URL: http://web.archive.org/web/20010801213356/www.ampiprlining.com/index.html  http://web.archive.org/web/20010408210145/ampipelining.com/contacting/Graphics.html  http://web.archive.org/web/20010408210145/ampipelining.com/Process/Index.html.

(Continued)

*Primary Examiner* — Cuong Q Nguyen
(74) *Attorney, Agent, or Firm* — Brian S. Steinberger; Law Offices of Brian S. Steinberger, P.A.

(57) ABSTRACT

Devices, apparatus, systems and methods of using a portable heating unit that does not use a separate compressor or blower or vacuum. The unit can be attached to an inlet of a piping system or section and be used to dry the interior walls of the piping system or section, and/or heat coatings passing through the piping system or section, etc. The portable heating unit includes a heater attached to an inlet end of a manifold, where the manifold can include alternative inlet end and two outlet ends. The inlet and outlet ends of the manifold can have quick connect fittings that allow similar fittings to be easily mateably attached thereto by rotating the fittings with one another. A quick connect/disconnect air pressure regulator with similar quick connect fitting can be attached to anyone of the inlet and outlet ends of the manifold. A quick connect/disconnect plug or plugs with similar quick connect fitting can close off any of the inlet and outlet ends of the manifold. The portable heating unit can be used with both a separate compressor and blower/filter having vacuum generator. The portable heating unit can also be used with only a compressor. The portable heating unit can also be used with only a vacuum generator.

16 Claims, 15 Drawing Sheets

U.S. PATENT DOCUMENTS

| | | | |
|---|---|---|---|
| 2,087,694 | A | 7/1937 | Malmros |
| 2,298,775 | A | 10/1942 | Raiche |
| 2,497,021 | A | 2/1950 | Sterns |
| 3,139,704 | A | 7/1964 | McCune |
| 3,139,711 | A | 7/1964 | Soderberg, Jr. |
| 3,151,418 | A | 10/1964 | Powell et al. |
| 3,286,406 | A | 11/1966 | Ashworth |
| 3,382,892 | A | 5/1968 | Cerbin |
| 3,385,587 | A | 5/1968 | Hall, Jr. |
| 3,440,400 | A | 4/1969 | Cotts |
| 3,485,671 | A | 12/1969 | Stephens |
| 3,608,249 | A | 9/1971 | Sullivan |
| 4,005,549 | A | 2/1977 | Perry |
| 4,117,308 | A | 9/1978 | Boggs |
| 4,314,427 | A | 2/1982 | Stoltz |
| 4,333,277 | A | 6/1982 | Tasedan |
| 4,505,613 | A | 3/1985 | Koga |
| 4,579,596 | A | 4/1986 | Murzyn |
| 5,007,461 | A | 4/1991 | Naf |
| 5,045,352 | A | 9/1991 | Mueller |
| 5,046,289 | A | 9/1991 | Bengel et al. |
| 5,085,016 | A | 2/1992 | Rose |
| 5,231,804 | A | 8/1993 | Abbott |
| 5,460,563 | A | 10/1995 | McQueen, Jr. |
| 5,499,659 | A | 3/1996 | Naf |
| 5,622,209 | A | 4/1997 | Naf |
| 5,707,702 | A | 1/1998 | Brady, Jr. et al. |
| 5,800,629 | A | 9/1998 | Ludwig |
| 5,915,395 | A | 6/1999 | Smith |
| 5,924,913 | A | 7/1999 | Reimelt |
| 5,950,681 | A | 9/1999 | Reimelt |
| 6,345,632 | B1 | 2/2002 | Ludwig |
| 6,423,152 | B1 | 7/2002 | Landaas |
| 6,739,950 | B1 | 5/2004 | Kruse |
| 7,041,176 | B2 | 5/2006 | Kruse |
| 7,066,730 | B2 * | 6/2006 | Macaluso ............. 432/225 |
| 7,270,847 | B2 | 9/2007 | Horn |
| 7,517,409 | B1 | 4/2009 | Gillanders |
| 2004/0132387 | A1 | 7/2004 | Kruse |
| 2007/0128353 | A1 | 6/2007 | Gillanders |

FOREIGN PATENT DOCUMENTS

| | | |
|---|---|---|
| EP | 0299134 | 2/1988 |
| EP | 0393433 | 4/1990 |
| EP | 0511790 | 7/1993 |
| EP | 0634229 | 7/1994 |
| EP | 0637737 | 7/1994 |
| EP | 09850135.6 | 10/2009 |
| GB | 2140377 | 11/1984 |
| JP | 5822663 | 2/1983 |
| JP | 410036764 | 2/1998 |
| SU | 116040 | 2/1959 |
| WO | 2009/005514 | 10/2009 |

OTHER PUBLICATIONS

American Pipe Lining, Inc., In-place pipe restoration, 10 pages., Mar. 30, 2001, [online], [ retrieved on Oct. 25, 2005], retrieved from the internet: <URL: http://web.archive.org/web/20030623154738/ampiplining.com/index.html http://web.archive.org/web/20030604140510/ampiplining.com/info/company.html http://web.archive.org/web/20030604140015/ampipelining.com/process/index.html.

American Pipe Lining, Inc., In-place pipe restoration, 8 pages., Apr. 1, 2001, [online], [ retrieved on Oct. 25, 2005], retrieved from the internet: <URL: http://web.archive.org/web/20030623154738/ampipelining.com/index.html http://web.archive.org/web/20030604140015/ampipelining.com/process/index.html http://web.archive.org/web/20030604140015/ampipelining.com/process/index.html.

ACE DuraFlo—The Modern Pipe Renovation System, 8 pages, May 18, 2001, [online], [retrieved on Oct. 20, 2005], retrieved from the internet: <URL: http://web.archive.org/web/20010518064023/http://www.aceduraflo.com/ http://web.archive.org/web/20010813210317/www.aceduraflo.com/process/index.html http://web.archive.org/web/20011020232815/www.aceduraflo.com/why.html.

ACE DuraFlo—The Modern Pipe Renovation System, 8 pages, Aug. 16, 2001, [online], [retrieved on Oct. 20, 2005], retrieved from the internet: <URL: http://web.archive.org/web/20010816233707/http://www.aceduraflo.com/index.html http://web.archive.org/web/20010813210317/www.aceduraflo.com/process/index.html http://web.archive.org/web/2001102023815/www.aceduraflo.com/why.html.

ACE DuraFlo—The Modern Pipe Renovation System, 12 pages, 010-21-2001, [online], [retrieved on Oct. 20, 2005], retrieved from the internet: <URL: http://web.archive.org/web/20011021003415/http://www.aceduraflo.com/index.html http://web.archive.org/web/20011214035125/www.aceduraflo.com.process/index.html http://web.archive.org/web/20011201094809/www.aceduraflo.com/why.html.

ACE DuraFlo—The Modern Pipe Renovation System, 10 pages, 011-29-2001, [online], [retrieved on Oct. 20, 2005], retrieved from the internet: <URL: http://web.archive.org/web/20011129000953/http://www.aceduraflo.com/ http://web.archive.org/web/20011214034040/www.aceduraflo.com/process/index.html http://web.archive.org/web/20011214035125/www.acreduraflo.com/why.html.

ACE DuraFlo—The Modern Pipe Renovation System, 12 pages, Dec. 14, 2001, [online], [retrieved on Oct. 20, 2005], retrieved from the internet: <URL: http://web.archive.org/web/20011214171031/http://www.aceduraflo.com http://web.archive.org/web/20011214034040/www.aceduraflo.com/process/index.html http://web.archive.org/web/20011214035125/www.aceduraflo.com/why.html.

ACE DuraFlo—The Repiping Alternative, 9 pages, [online], [retrieved on Oct. 20, 2005], retrieved from the internet: <URL: http://aceduraflo.com/whyaceduraflo.html http://aceduraflo.com/casestudies.html http://aceduraflo.com/news.html.

(Brochure) American Pipe Lining Inc, In-Place Pipe Restoration, date unknown.

(Manual) ACE DuraFlo Dust Collector Service Manual, 4 pages, ACE DuraFlo Systems, LLC, Sep. 2001.

Robert F. Brady, Jr., Fact Sheet From the navy Pollution Prevention conference on the Restoration of Drinking Water Piping with Non-toxic Epoxy Linings, Envirosense, 1995, 4 pages.

Robert F. Brady, Jr., James D. Adkins, Expoxy Lining for Shipboard Piping Systems, Materials Chemistry Branch, 1994, 29 pages.

Drew J. Dembroske, John, H. Benson, Guiseppe E. Rossi, Noel S. Leavitt, Michael A. Mull, John K. McMullen, Evolutions, in U.S. Navy Shipboard Sewage and Graywater Programs, 16 pages.

Public Works Technical Bulletin No. 420-49-35, In-Situ Epoxy Coating for Metallic Pipe, 2001, 32 pages.

A-S Method, We are a person you are looking for! A-S Method Pipe Rehabilitation System, Toyo Lining Co., Ltd., APL 00789-APL 00807, 1981, 19 pages.

A-S method for rehabilitating deteriorated water supply pipes in an existing building, technical Evaluation Toyo Lining Co., Ltb., APL 000704-APL 00759, 1981, 56 pages.

Gillanders, International Search Report received from the Patent Office for PCT/US09/05514, 4 pages.

Gillanders, International Search Report received from the Patent Office for PCT/US09/05514, 11 pages.

* cited by examiner

PORTABLE HEATING APPARATUS FOR HEATING INTERIOR PIPING SYSTEMS

This invention is a Continuation-In-Part of U.S. patent application Ser. No. 12/378,670 filed Feb. 18, 2009 now U.S. Pat. No. 8,206,783, which is a Continuation-In-Part of U.S. patent application Ser. No. 11/946,107 filed Nov. 28, 2007 and U.S. patent application Ser. No. 11/649,647 filed Jan. 4, 2007, now U.S. Pat. No. 7,858,149 which is a Continuation-In-Part of U.S. patent application Ser. No. 11/246,825 filed Oct. 7, 2005, now U.S. Pat. No. 7,517,409, which was a divisional application of U.S. patent application Ser. No. 10/649,288 filed Aug. 23, 2003, now U.S. Pat. No. 7,160,574, which claims the benefit of priority to U.S. Provisional Application Ser. No. 60/406,602 filed Aug. 28, 2002.

FIELD OF INVENTION

This invention relates to piping systems, in particular to apparatus, devices, systems and methods of heating the interior of piping systems, and for generating heated air that adds heat to the air from an air blower or vacuum, or both, or in combination, for the use in heating the inside of metallic or non metallic pipes.

BACKGROUND AND PRIOR ART

Over the years many attempts have been used to clean and restore pipes in-place using various processes and various devices that involve moving heated air through the piping section or system. See for example, U.S. Pat. Nos. 7,160,574 and 7,517,409 to Gillanders, which is by the same assignee and includes a co-inventor of the subject invention; 5,950,6812 to Reimelt, 4,503,613 to Koga, and 5,007,461 to Naf.

Conventionally in the restoration or placement of a barrier coating to the interior of a pipe, heat is generally 1) added at the source of the air blower, 2) added at the suction/open end of the piping system when a vacuum is used, or 3) heating wires are inserted into the pipe.

Each of these techniques has presented challenges to the operator in controlling heat to the pipe sections. For example when wires are inserted there is difficulty in the wires navigating bends and intersections. When confronted with valves or other restrictions within a pipe, such as rust build up, wires may not be able to be inserted at all.

A heater connected at the blower may have to be located some distance to the actual pipe leaving the heated air subject to heat loss as it travels from the blower source to the pipe. The use of heaters associated with compressors as the heat generating source are also generally bulky and costly to operate.

In the presently applied processes, heated air is an essential component and is used in at least three stages of the process 1) drying the pipes, 2) heating the pipes for application of the barrier coating and 3) drying the barrier coating. Presently whether one pushes air into a piping system with a compressor or pulls air through with vacuums, typical heating devices are located at the air driver source i.e.: compressor or in the case of a vacuum working alone a heating unit may be installed at the main entry point to the piping system.

Various types of heating devices that usually have a compressor and similar types of generator components are typically located outside the building or at a distance to the pipe source. The physical locations of these exterior devices are also undesirable due to their size and noise and exhausting considerations. These types of units that are associated with heating and moving air are often large, bulky and typically fossil fuel driven.

Various drawbacks with prior art heating devices include:
1) heat loss while the air travels from source to the piping system
2) run up in costs when relying on the use of diesel or gas type fuels
3) limits to the heat achieved
4) limited control to the operator to adjust the heat for each piping section. For example, pipe sections may be located at varying distances from the source yet the heat generated is from one source and can be used to service multiple service points involving pipe sections of varying diameters and connections in varying distances form the source
5) The typical heat sources are over sized due to common usage of a single source of equipment during the various stages of the pipe restoration operation. One typically is using, for example, a compressor during the epoxy drying stage when in reality what is actually required is a source of low volume heated air flow. The same can be said for the initial drying stage, when one can economically set up and heat and dry the piping system with out the use of compressed air.
6) Lack of adjustable control of heat and air flow at each inlet/outlet.
7) Limited ability to independently adjust air flow and heat. Current techniques have a limited use of the primary air delivery source limiting it to a single application per phase of application.

As referenced above, all of these systems do not adequately address the application and use of portable heating apparatus and techniques that permit the operator greater operational flexibility and operating efficiencies. Thus, the need exists for such an apparatus and application solutions.

SUMMARY OF THE INVENTION

A primary objective of the invention is to provide methods, systems and devices for providing controlled heated air to flow or be drawn through the interior walls of pipes while the pipes are in place, without having to physically remove and replace the pipes.

A secondary objective of the invention is to provide methods, systems and devices for providing controlled heated air to flow or be drawn through the interior walls of pipes, in place, to assist in the drying for the cleaning process of the interior walls of pipes.

A third objective of the invention is to provide methods, systems and devices for providing controlled heated air to flow or be drawn through the interior walls of pipes that are in place, to enhance the application of the placement and drying of a corrosion protection barrier coating to the interior walls of the pipes.

A fourth objective of the invention is to provide methods, systems and devices for providing controlled heated air to flow or be drawn through the interior walls of pipes, in place in a cost effective and efficient manner.

A fifth objective of the invention is to provide methods, systems and devices for providing controlled heated air to flow or be drawn through the interior walls of pipes, in place which is applicable to small diameter piping systems up to approximately 2" in diameter in piping systems or piping sections made of various materials such as galvanized steel, black steel, lead, brass, copper or other materials such as composites including plastics.

A sixth objective of the invention is to provide methods, systems and devices for providing controlled heated air to flow or be drawn through the interior walls of pipes, in place, reducing energy costs and reliance on the use of equipment using diesel or gas.

A seventh objective of the invention is to provide methods, systems and devices for heating the interior of pipes where users benefit from the savings in time associated with the restoration of an existing piping system.

An eight objective of the invention is to provide methods, systems and devices for heating the interior walls of pipes where the equipment package is able to function safely, cleanly, and efficiently in high customer traffic areas.

A ninth objective of the invention is to provide methods, systems and devices for heating the interior walls of pipes where the equipment components are mobile and maneuverable inside and outside buildings and within the parameters typically found in single-family homes, multi unit residential buildings and various commercial buildings and around service lines.

A tenth objective of the invention is to provide methods, systems and devices for heating the interior walls of pipes where the equipment components can operate quietly, within the strictest of noise requirements.

An eleventh objective of the invention is to provide methods, systems and devices for heating the interior walls of pipe in a variety of piping environments, and operating parameters such as but not limited to a wide temperature range, at a wide variety of airflows and air pressures, and the like.

A twelfth objective of the invention is to provide methods, systems and devices for heating the interior walls of pipes where the barrier coating material and the process is functionally able to deliver turnaround of a restored piping system to service within approximately 12 hours or less.

A thirteenth objective of the invention is to provide methods, systems and devices for heating the interiors of a piping system in a single set up operation in various sized pipes that can include diameters larger than approximately 2"

A fourteenth objective of the invention is to provide methods, systems and devices for heating interiors of piping systems with a portable heating apparatus and techniques that permits the operator greater operational flexibility and operating efficiencies over existing techniques.

A preferred embodiment the portable heating device or apparatus for generating heated air can include a manifold for transporting a flow of air having an air inlet through which air is drawn and at least one air outlet for the emission of the heated air, a heater with a heating chamber that is attached to the manifold, and a heater control valve for controlling the heating elements and valves to control the flow of air.

The heating chamber can include a heating element having an inlet end for directing air into the chamber and an outlet end for emitting heated air therefrom.

The manifold can include a first inlet end a second inlet end for drawing air therethrough, the manifold having a first outlet end and a second outlet end for passing air therefrom, at least one of the first inlet end and the second inlet end being attached to the outlet end of the heating chamber, and wherein at least one of the first outlet end and the second outlet end being attached to an end of a pipe.

The portable heating device or apparatus can include a first shut-off valve for opening and closing the first outlet end of the manifold, a first handle for operating the first shut-off valve, a second shut-off valve for opening and closing the second outlet end of the manifold, and a second handle for operating the second shut-off valve.

The portable heating device or apparatus can include heat dissipating legs attached to at least one of the heating chamber and the manifold, for dissipating external heat therefrom.

The portable heating device or apparatus can include quick disconnect fittings attached to the inlet end of the heating chamber, and attached to at least one of the first inlet end and the second inlet end of the manifold, and attached to at least one of the first outlet end and the second outlet end of the manifold. Each quick disconnect fitting can have opposing clamp edges and protruding portions between the clamp edges, wherein each quick disconnect fitting lockably attaches to another quick disconnect fitting by rotating the clamp edges of each fitting about the protruding portions of each fitting.

The portable heating device or apparatus can include a mechanically actuated air regulator having an air inlet end and an air outlet end, the outlet end being attached to the inlet end to the heating chamber, the air regulator for regulating air pressure between zero up to 200 CFM and between zero and 200 PSI.

The portable heating device or apparatus can include a mechanically actuated air regulator having an air inlet end and an air outlet end, the outlet end being attached to one of the first inlet end and the second inlet end of the manifold, the air regulator for regulating air pressure between zero up to 200 CFM and between zero and 200 PSI.

The portable heating device or apparatus can include a mechanically actuated air regulator having an air inlet end and an air outlet end, the outlet end being attached to one of the first outlet end and the second outlet end of the manifold, the air regulator for regulating air pressure between zero up to 200 CFM and between zero and 200 PSI.

A method of using a portable heating unit can include the steps of providing a heating chamber with a heating element having an inlet end for directing air into the chamber and an outlet end, providing a manifold having a first inlet end a second inlet end, and a first outlet end and a second outlet end, attaching at least one of the first inlet end and the second inlet end to the outlet end of the heating chamber, attaching at least one of the first outlet end and the second outlet end of the manifold to an inlet of a piping system, generating heated air from the outlet end of the heating chamber, drawing the heated air through the one of the first inlet end and the second inlet end of the manifold and passing the heated air from one of the first outlet end and the second outlet end of the manifold into the inlet of the piping system.

The method can include dissipating external heat from the heating chamber and from the manifold.

The method can include regulating air pressure into the inlet end to the heating chamber between zero up to 200 CFM and between zero and 200 PSI.

The method can include regulating air pressure into at least one of the first inlet end and the second inlet end of the manifold between zero up to 200 CFM and between zero and 200 PSI.

The method can include regulating air pressure into one of the first outlet end and the second outlet end of the manifold between zero up to 200 CFM and between zero and 200 PSI.

The method can include generating compressed air from a compressor into at least one of the first inlet end and the second inlet end of the manifold, and forming a vacuum with a blower to pull air from at least one of the first outlet end and the second outlet end of the manifold.

The method can include dispensing a liquid coating into an inlet of the piping system and generating a sand emission into another inlet of the piping system. The Air Distribution Manifold in combination with air regulator assembly or shut off valves can be used to regulate air during the sanding stage and during the coating stage.

A portable heater unit for a piping system can include a heating chamber with a heating element having an inlet end for directing air into the chamber and an outlet end for emitting heated air therefrom, a manifold having a first inlet end a second inlet end for drawing air therethrough, the manifold having a first outlet end and a second outlet end for passing air therefrom, at least one of the first inlet end and the second inlet end being attached to the outlet end of the heating chamber, and wherein at least one of the first outlet end and the second outlet end being attached to an end of a pipe, a heater control valve for operating the heating element in the heating chamber, a first shut-off valve for opening and closing the first outlet end of the manifold, a first handle for operating the first shut-off valve, a second shut-off valve for opening and closing the second outlet end of the manifold, a second handle for operating the second shut-off valve, heater heat dissipating legs attached directly to the heater for dissipating heat from the heater chamber, manifold heat dissipating legs attached directly to the manifold for dissipating heat from the manifold, and quick disconnect fittings attached to the inlet end of the heating chamber, and attached to at least one of the first inlet end and the second inlet end of the manifold, and attached to at least one of the first outlet end and the second outlet end of the manifold, each quick disconnect fitting having opposing clamp edges and protruding portions between the clamp edges, wherein each quick disconnect fitting lockably attaches to another quick disconnect fitting by rotating the clamp edges of each fitting about the protruding portions of each fitting.

The novel invention has applicability in the heating of the interior surfaces of metal and nonmetal pipes. In a process of drying, cleaning, and application and drying of an internal barrier coating of a pipe, heat can be used to accelerate the various processes used in preparing the inside of pipes for receipt of an internal barrier coating. Heat can also be used to accelerate the curing process of the barrier coating applied to the inside of the pipe.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
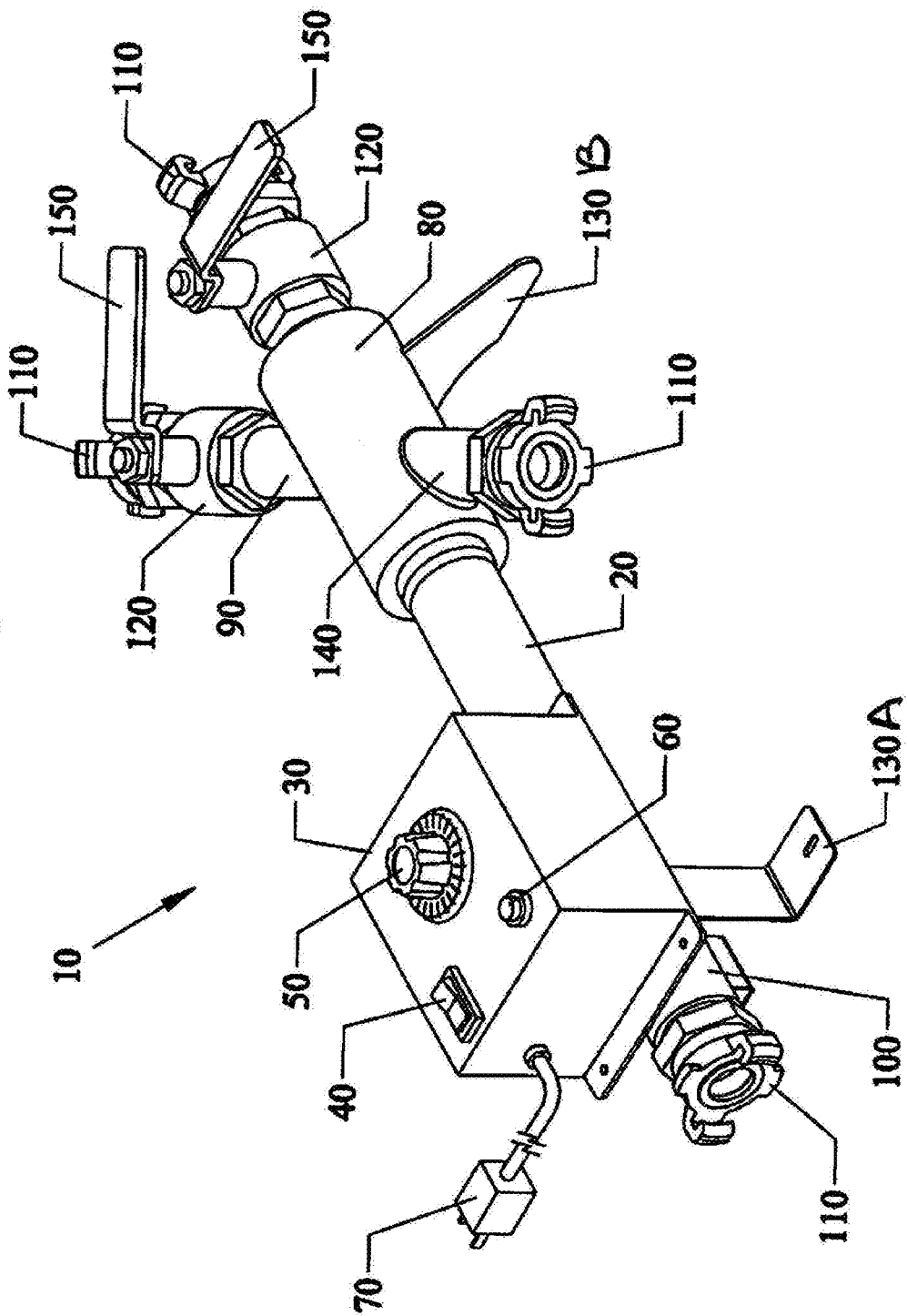
FIG. 1 is a top front perspective view of a heating and air distribution module apparatus for use in the invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The subject invention can be used with the Barrier Coating Corrosion Control Methods and Systems for Interior Piping Systems described and shown in parent patent applications U.S. patent application Ser. No. 10/649,288 filed Aug. 27, 2003, now U.S. Pat. No. 7,160,574 and U.S. patent application Ser. No. 11/246,825 filed Oct. 7, 2005, now U.S. Pat. No. 7,517,409, both to the same assignees as that of the subject invention and both of which are incorporated by reference.

The subject invention also relates to U.S. patent application Ser. No. 12/378,670 filed Feb. 18, 2009, which is a Continuation-In-Part of U.S. patent application Ser. No. 11/946,107 filed Nov. 28, 2007 and U.S. patent application Ser. No. 11/649,647 filed Jan. 4, 2007, which is a Continuation-In-Part of U.S. patent application Ser. No. 11/246,825 filed Oct. 7, 2005, now U.S. Pat. No. 7,517,409, which was a divisional application of U.S. patent application Ser. No. 10/649,288 filed Aug. 23, 2003, now U.S. Pat. No. 7,160,574, which claims the benefit of priority to U.S. Provisional Application Ser. No. 6/406,602 filed Aug. 28, 2002, all assigned to the same assignee as the subject invention and which are all incorporated by reference.

The components in the figures will now be described.

10. Portable heating unit.—the base unit embodies the operational components, the unit is designed to operate with using multi directional airflow, that are connected from outside side sources.

20. Airflow heater.—is an electrically powered air heater designed for high flow rates at low pressure drops. It incorporates an open coil spiral wound element which provides quick heat up and cool down cycles with maximum heat transfer. Capable of handling airflows up to approximately 200 CFM and up to approximately 200 PSI. Maximum outlet temperature is approximately 900° F. (approximately 482° C.). Maximum inlet temperature is approximately 250° F. (approximately 121° C.) Maximum wattage approximately 6 kw
30. Controller.—contains, fuse, power switch (40) and rheostat (50), indicator light (60) and power cord (70)
40. Power switch.
50. Rheostat.
60. Indicator light.
70. Power cord.
80. Air distribution manifold.—capable of handling at least one inlet and at least one outlet, up to approximately 200 CFM and approximately 200 PSI
90. Air outlet.
100. Main air inlet.
110. Quick disconnect air fitting having opposing clamp edges and protruding portions therebetween.
120. Shutoff valve.
130A, 130B. Heat dissipating legs.
140. Alternate air inlet.
150. Shutoff handle in no flow position.
160. Shutoff handle in flow position.
170. Inlet/outlet quick disconnect plug prevents flow.
180. Air regulator assembly with quick disconnects.
185. Rotatable turn knob
190. Air regulator.—capable of handling up to approximately 200 CFM and approximately 200 PSI
195. Meter
200. Piping system inside of a building (commercial or residential)
300. Setup configuration with Compressor
400. Compressor
500. Mini Dust Collector/blower
600. Setup configuration with Blower and no compressor
700. Setup configuration with collector and no compressor
CA=Compressed Air
HA=Heated Air
VA=Vacuum
AB=Ambient The invention is an improved device for generating heated air which is particularly, but not exclusively used for providing heat to air flow for heating the interior of a pipe or pipes in a piping system.

Figure 2:
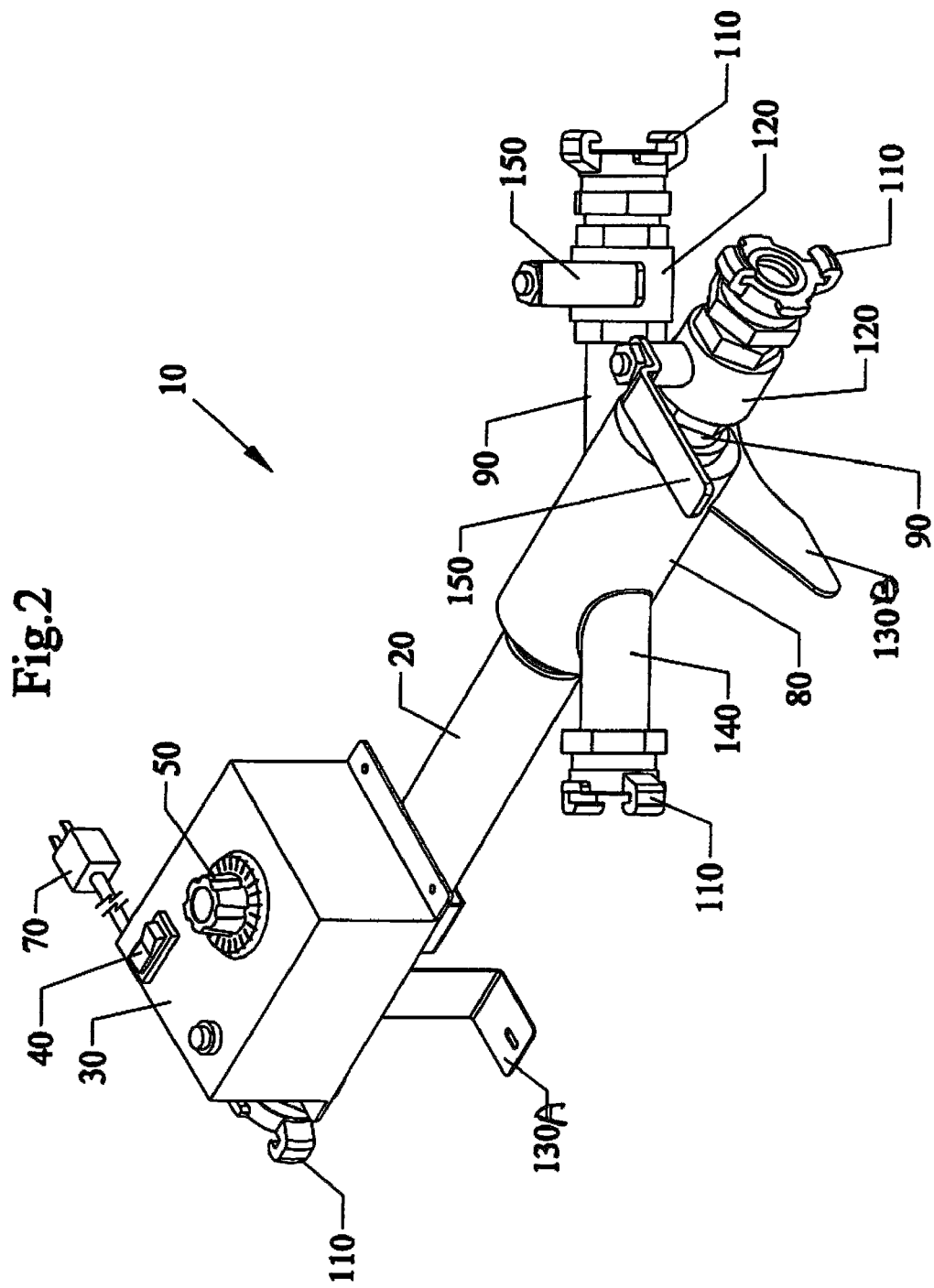
FIG. 2 is a top rear perspective view of the apparatus of FIG. 1.
Figure 3:
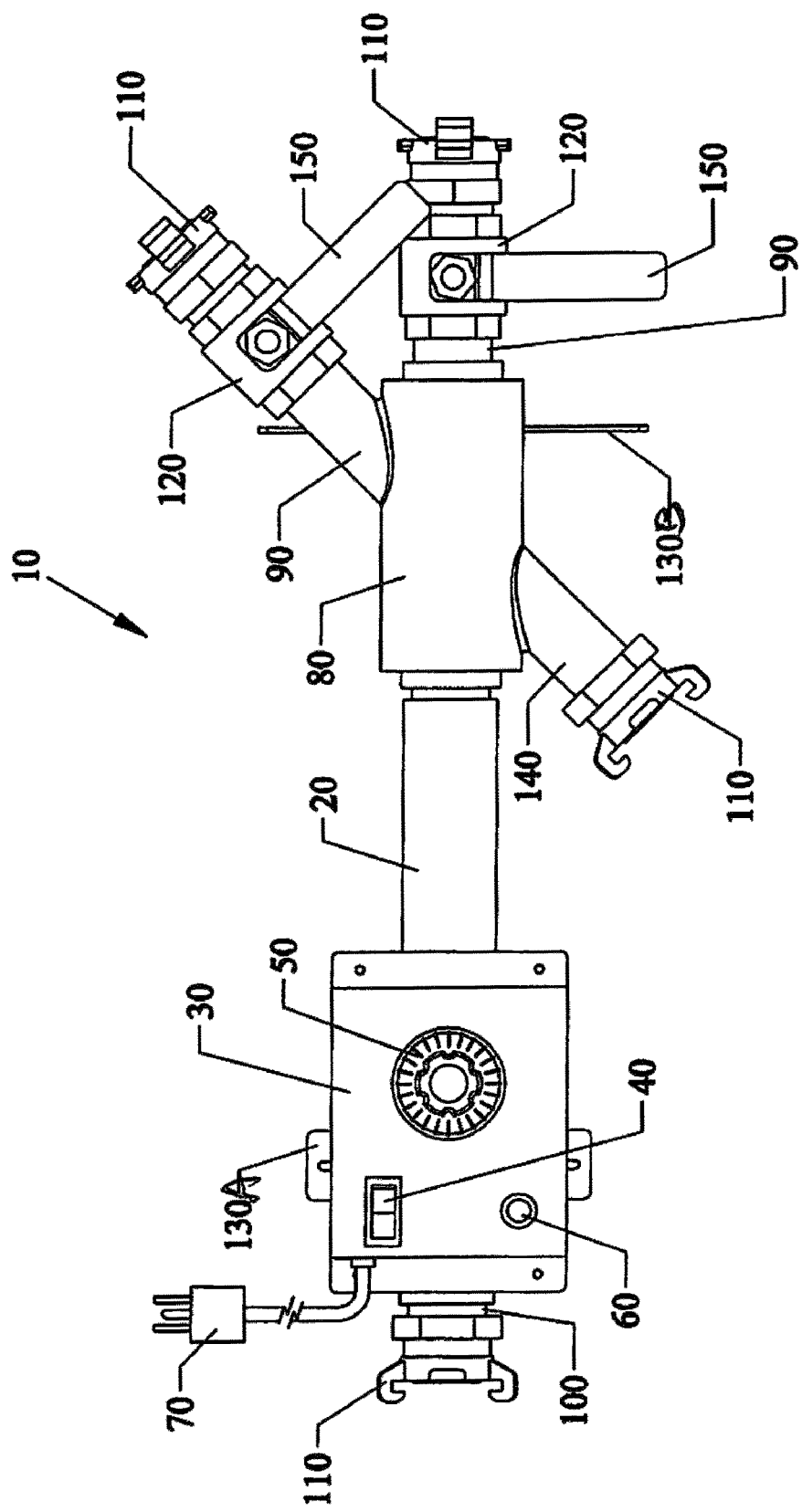
FIG. 3 is a top view of the apparatus of FIG. 1.
Figure 4:
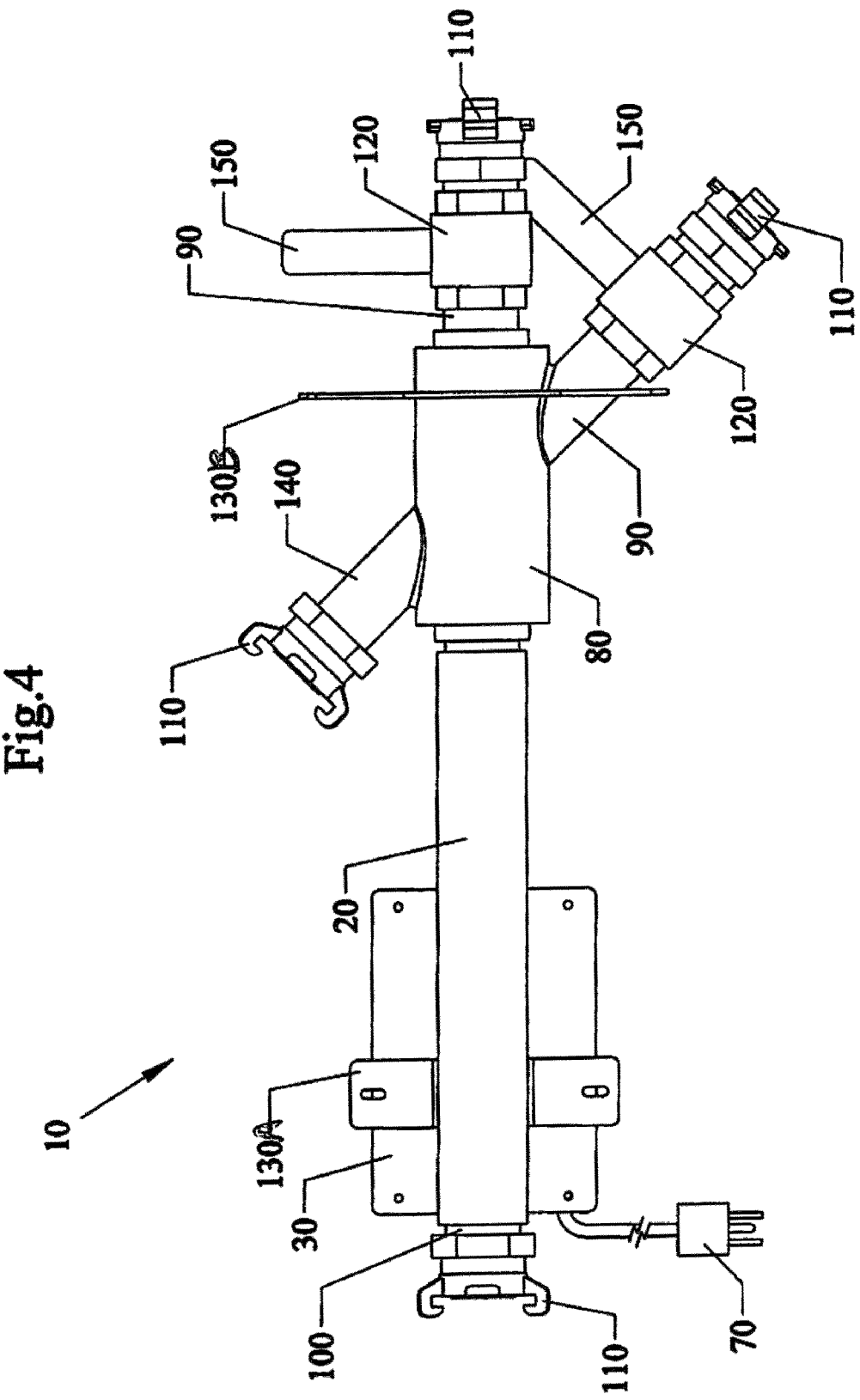
FIG. 4 is a bottom view of the apparatus of FIG. 1.
Figure 5:
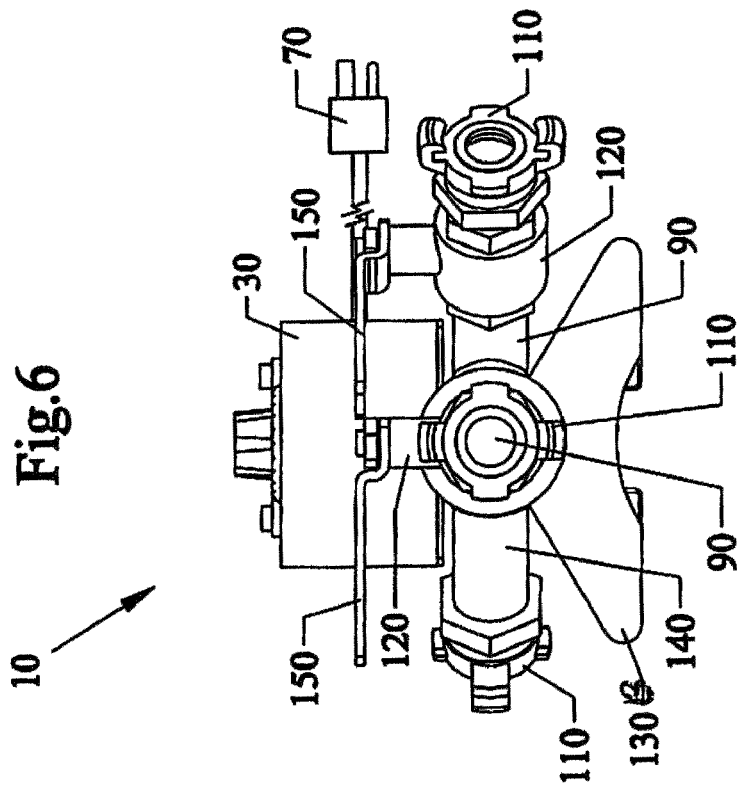
FIG. 5 is a right side end view of the apparatus of FIG. 1.
Figure 6:
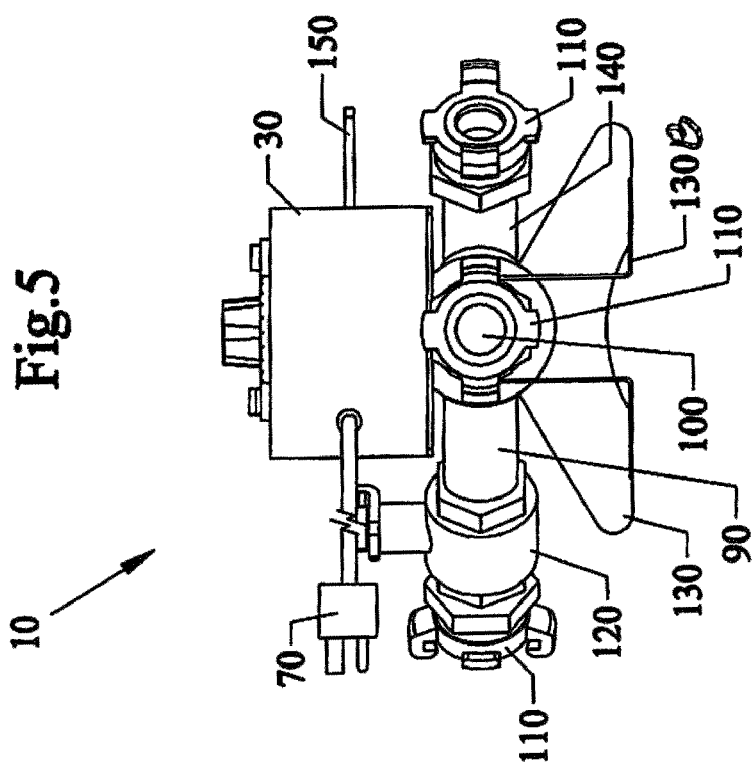
FIG. 6 is a left side end view of the apparatus of FIG. 1.

FIG. 1 is a top front perspective view of a heating and air distribution module apparatus 10 for use in the invention. FIG. 2 is a top rear perspective view of the apparatus 10 of FIG. 1. FIG. 3 is a top view of the apparatus 10 of FIG. 1. FIG. 4 is a bottom view of the apparatus 10 of FIG. 1. FIG. 5 is a right side end view of the apparatus 10 of FIG. 1. FIG. 6 is a left side end view of the apparatus 10 of FIG. 1.

Referring to FIGS. 1-6, the portable heating unit 10 can operate using multi directional airflow, that are connected from outside sources. The portable heating unit 10 can include an airflow heater 20 with controller 30 and main air inlet 100 with quick disconnect air fitting 110. The controller 30 can include a fuse, power switch 40 and rheostat 50, indicator light 60 and power cord 70 to run the components and the heater 20. Heat dissipating legs 130 can be attached to the airflow heater 20 to dissipate heat therefrom.

On the opposite end of the airflow heater 20 can be an air distribution manifold 80 that is capable of handling at least one inlet and at least one outlet, up to approximately 200 CFM and approximately 200 PSI. Another quick disconnect air fitting 110 can extend from one side of the air distribution manifold 80 by an alternate air inlet 140, and an air outlet 90 with shutoff valve 120 and another quick disconnect air fitting 110 with shutoff handle 150 can extend from another side of the air distribution manifold 80. Extending from an end of the air distribution manifold 80 can be still another shutoff valve 120 with a quick disconnect air fitting 110 and shutoff handle 150. Another set of heat dissipating legs 130A and 130B can also be attached to the air distribution manifold so as to assist in dissipating heat therefrom.

The Distribution Manifold 80 in combination with air regulator assembly 180 or shut off valves 120 can be used to regulate air during the sanding stage and during the coating stage, and during the drying stage.

The airflow heater 20 used in FIGS. 1-6 can be an electrically powered air heater designed for high flow rates at low pressure drops, and can include an open coil spiral wound element which provides quick heat up and cool down cycles with maximum heat transfer.

The airflow heater 20 which can be capable of handling airflows up to approximately 200 CFM and up to approximately 200 PSI. Maximum outlet temperature is approximately 900° F. (approximately 482° C.). Maximum inlet temperature is approximately 250° F. (approximately 121° C.) Maximum wattage approximately 6 kw.

Figure 7:
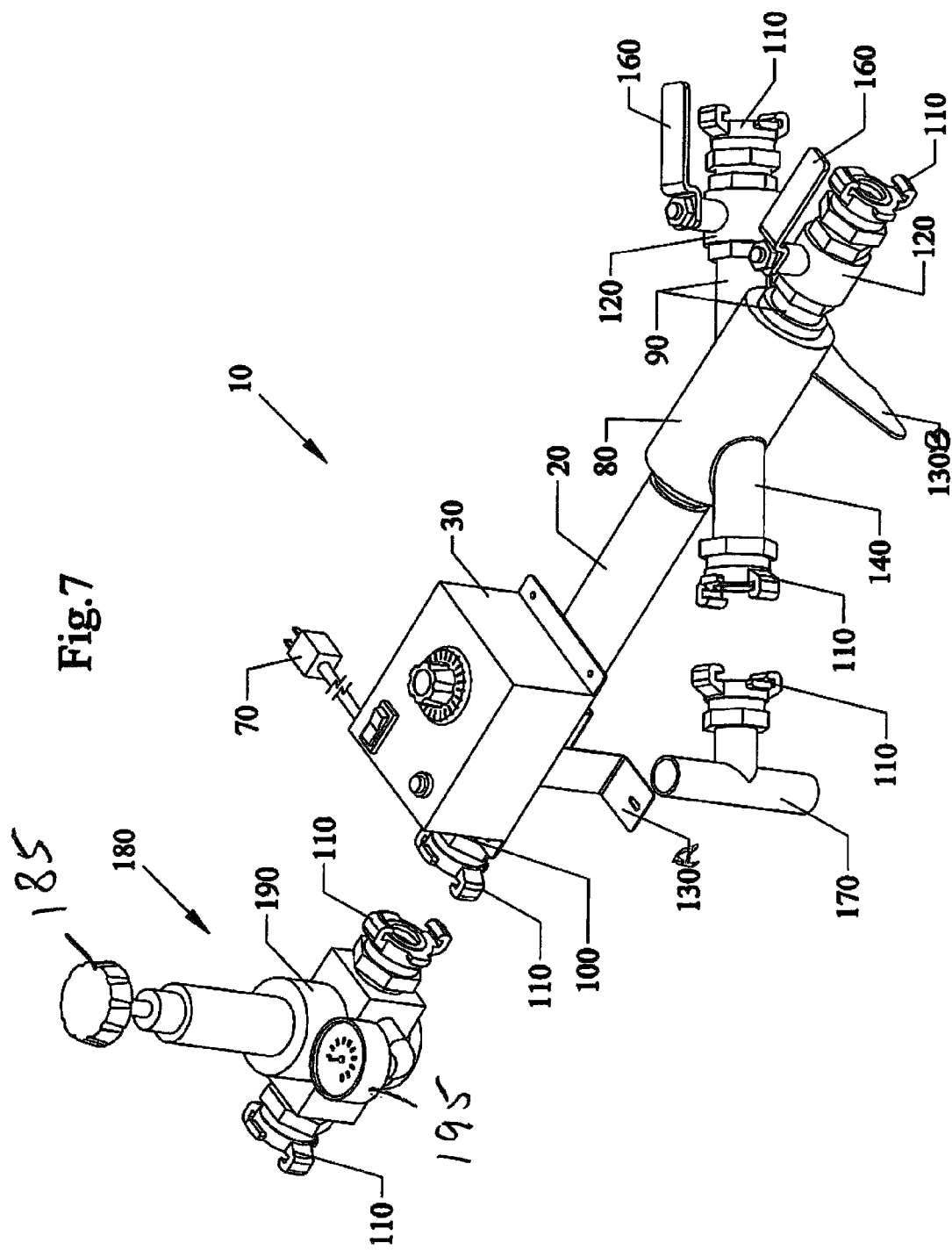
FIG. 7 is a top rear perspective exploded view of the apparatus of FIGS. 1-2 with optional air regulator assembly and quick disconnect plug positioned for assembly.
Figure 8:
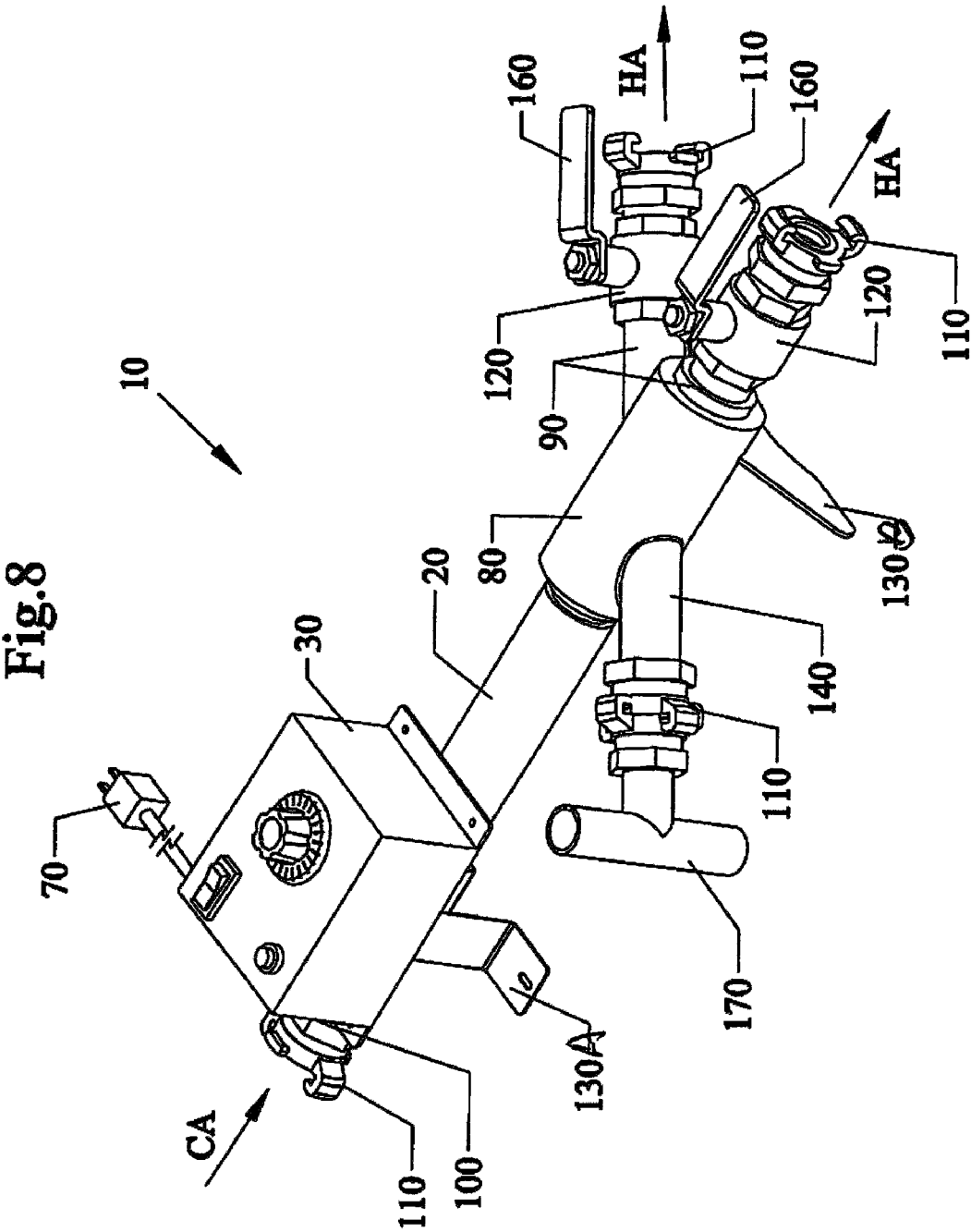
FIG. 8 is another top rear perspective of the apparatus of FIG. 2 showing basic configuration, with inlet and outlet air flows are identified as compressed air in and heated air out.
Figure 9:
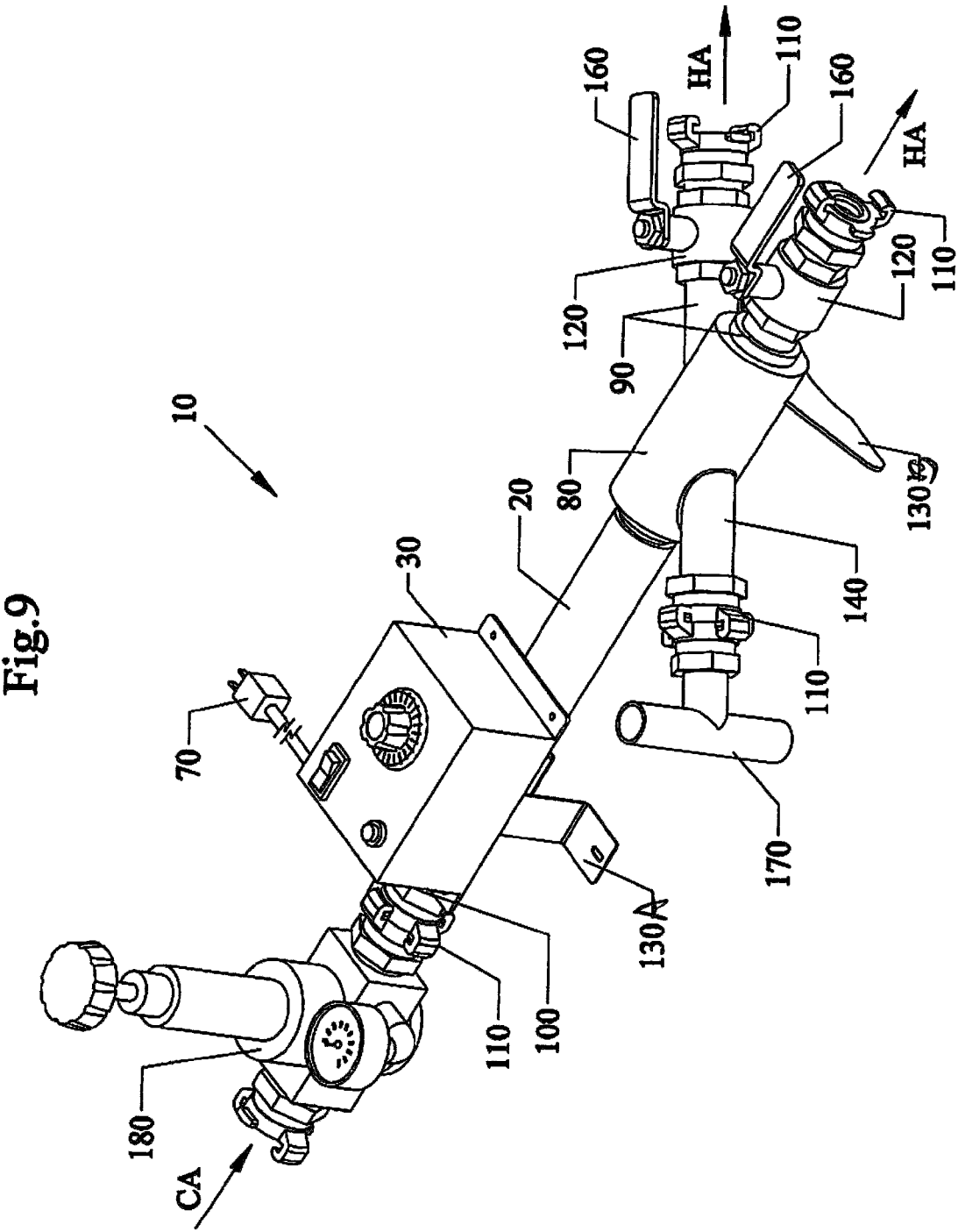
FIG. 9 is another top rear perspective of the apparatus of FIGS. 2 and 7 showing basic configuration with the air regulator installed to main air inlet and quick disconnect plug installed to alternate air inlet. Inlet and outlet air flows are identified as compressed air in and heated air out.

FIG. 7 is a top rear perspective exploded view of the apparatus 10 of FIGS. 1-2 with optional air regulator assembly 180 and quick disconnect plug 170 positioned for assembly. FIG. 8 is another top rear perspective of the apparatus 10 of FIG. 2 showing basic configuration, with inlet and outlet air flows are identified as compressed air in (CA) and heated air out (HA). FIG. 9 is another top rear perspective of the apparatus 10 of FIGS. 2 and 7 showing basic configuration with the air regulator 180 installed to main air inlet and quick disconnect plug 110 installed to alternate air inlet. The inlet and outlet air flows are identified as compressed air in (CA) and heated air out (HA).

Referring to FIGS. 7-9, the air regulator assembly 180 has a rotatable control knob 185 that controls airflow through an air regulator 190, which is capable of handling up to approximately 200 CFM (cubic feet per minute) and approximately 200 PSI (pounds per square inch) airflow therethrough.

A meter 195 can be calibrated for CFM and PSI scales. On both the inlet and outlet ends of the air regulator assembly can be quick disconnect fitting(s) 110, the outlet end of which can connect to like quick disconnect fitting 110 on the inlet end of the portable heating unit 10. The mateable quick disconnect fitting(s) 110 can mateably lock onto one another by rotating one quick disconnect fitting relative to the other so that the pair of clamp edges on each fitting lock about protruding portions between each of the clamp edges.

Additionally, unused inlet and outlet ends of the air distribution manifold 80 can be closed off with an inlet/outlet quick disconnect plug 170. Each quick disconnect plug can have a turnable handle end and an opposite end having a quick disconnect air fitting 110, so that rotating the clamp edges of the quick disconnect air fitting 110 about the quick disconnect air fitting 110 off an alternative air inlet 140 can close off and plug that alternative air inlet 140.

Figure 10:
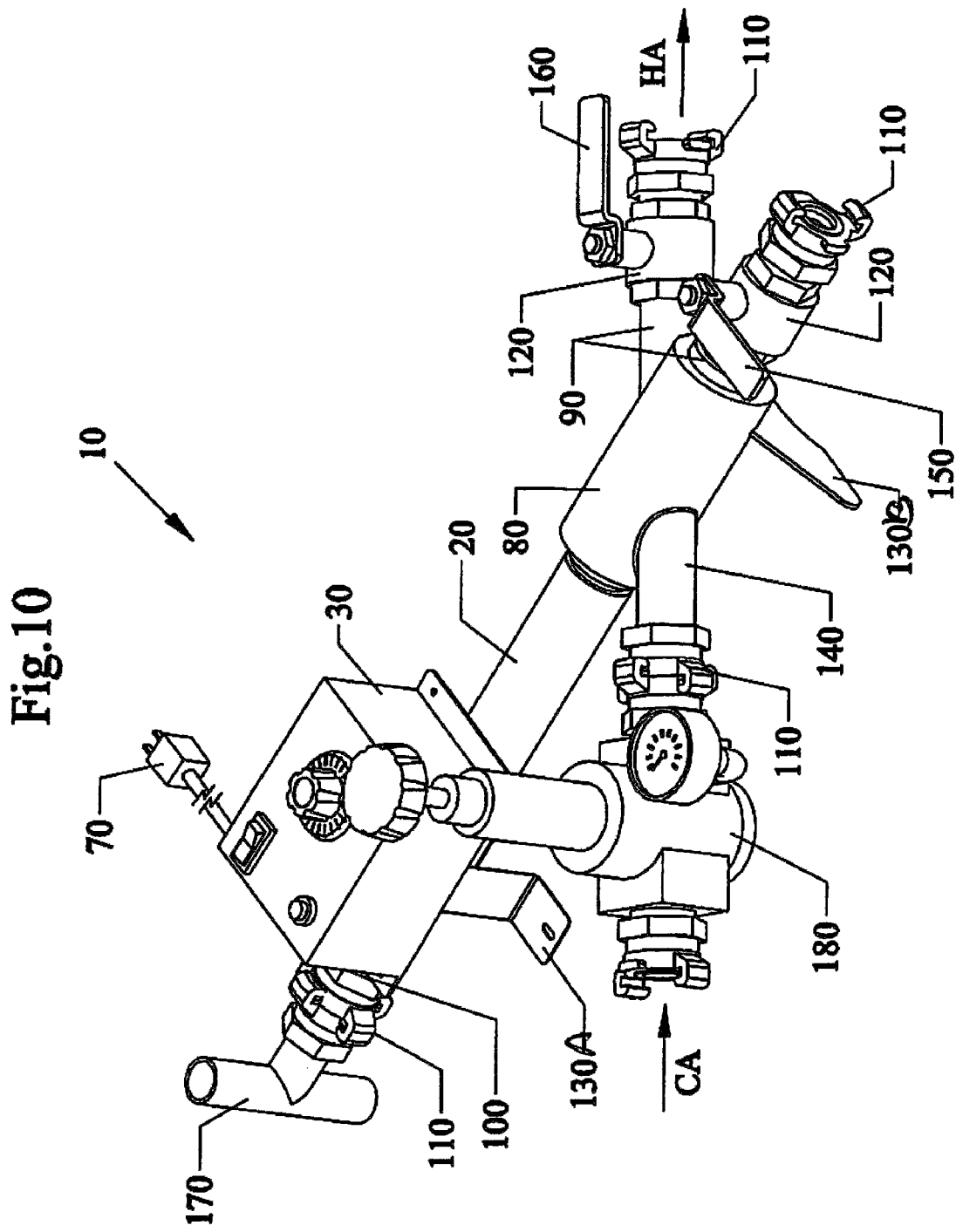
FIG. 10 is another top rear perspective of the apparatus of FIG. 2 showing main air inlet plugged and alternate air inlet being used, and optional air regulator assembly is shown installed on the alternate air inlet. Inlet and outlet air flows are identified as compressed air in and heated air out. Although only one outlet is shown open, both can be used.

FIG. 10 is another top rear perspective of the apparatus 10 of FIG. 2 showing main air inlet 100 plugged and alternate air inlet being used, and optional air regulator assembly is shown installed on the alternate air inlet. Inlet and outlet air flows are identified as compressed air in (CA) and heated air out (HA). Although only one outlet is shown open, both can be used.

Here, the main air inlet 100 is closed off by a quick disconnect plug 170. The clamp edges on the quick connect air fitting 110 locks to the protruding portions on the quick disconnect air fitting 110 on the main air inlet 100, and vice versa where the clamp edges on the quick disconnect air fitting 110 on the main air inlet 100 locks to the clamp edges on the quick disconnect air fitting 110 on the plug 170. The air regulator 180 outlet end is attached to the alternative inlet end 140 on the manifold 80 by mateably rotating like quick disconnect fitting(s) 110 to one another.

Figure 11:
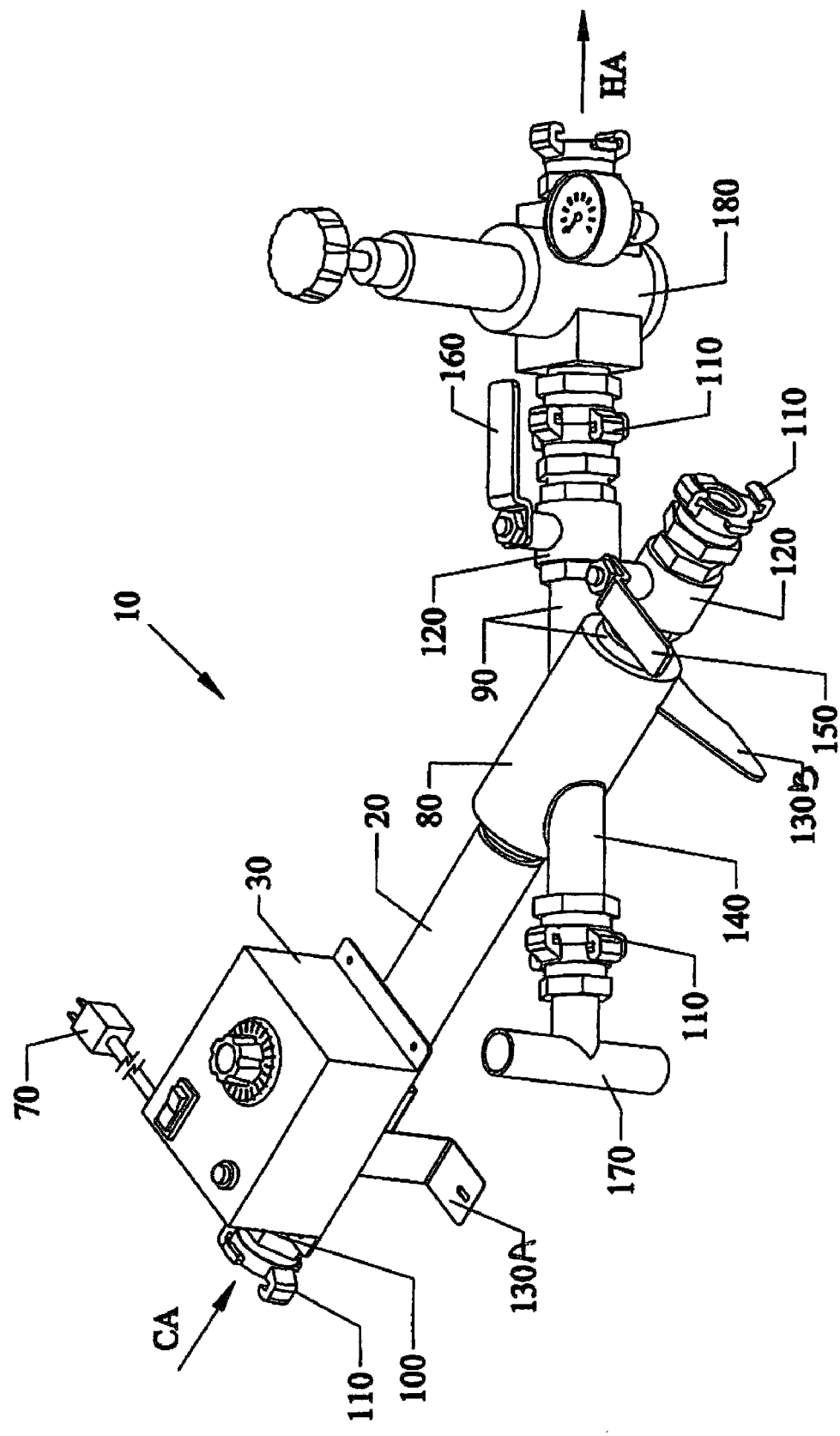
FIG. 11 is another top rear perspective of apparatus of FIGS. 2 and 7 showing basic configuration with alternate air inlet plugged and optional air regulator assembly installed to air outlet. Inlet and outlet air flows are identified as compressed air in and heated air out.

FIG. 11 is another top rear perspective of apparatus 10 of FIGS. 2 and 7 showing basic configuration with alternate air inlet 140 plugged and optional air regulator assembly 180 installed to air outlet of the manifold 80. Inlet and outlet air flows are identified as compressed air in (CA) and heated air out (HA).

Here, the alternate air inlet 100 is closed off by a quick disconnect plug 170. The clamp edges on the quick connect air fitting 110 locks to the protruding portions on the quick disconnect air fitting 110 on the alternate air inlet 100, and vice versa where the clamp edges on the quick disconnect air fitting 110 on the alternate air inlet 100 locks to the clamp edges on the quick disconnect air fitting 110 on the plug 170. The air regulator 180 inlet end is attached to one of the outlet ends on the manifold 80 by mateably rotating like quick disconnect fitting(s) 110 to one another.

Figure 12:
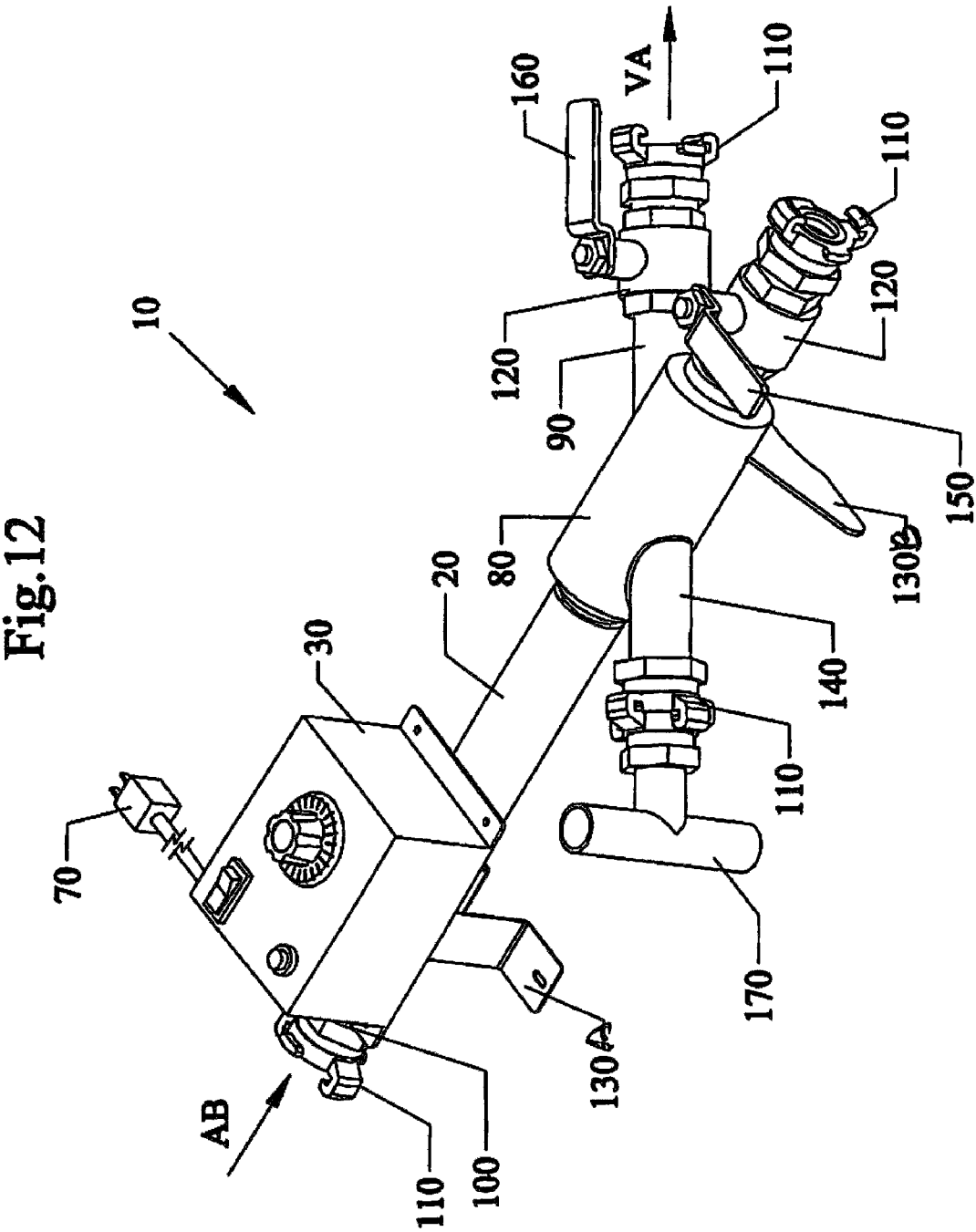
FIG. 12 is another top rear perspective of the apparatus of FIGS. 2 and 8 showing basic configuration with alternate air inlet plugged. Air flows are defined as ambient air into the main inlet with heated air out of the air outlet via a vacuum being applied at the outlet.

FIG. 12 is another top rear perspective of the apparatus 10 of FIGS. 2 and 8 showing basic configuration with alternate air inlet 140 plugged. Air flows are defined as ambient air (AB) into the main inlet with heated air (VA) out of the air outlet via a vacuum being applied at the outlet at the point identified as VA.

Figure 13:
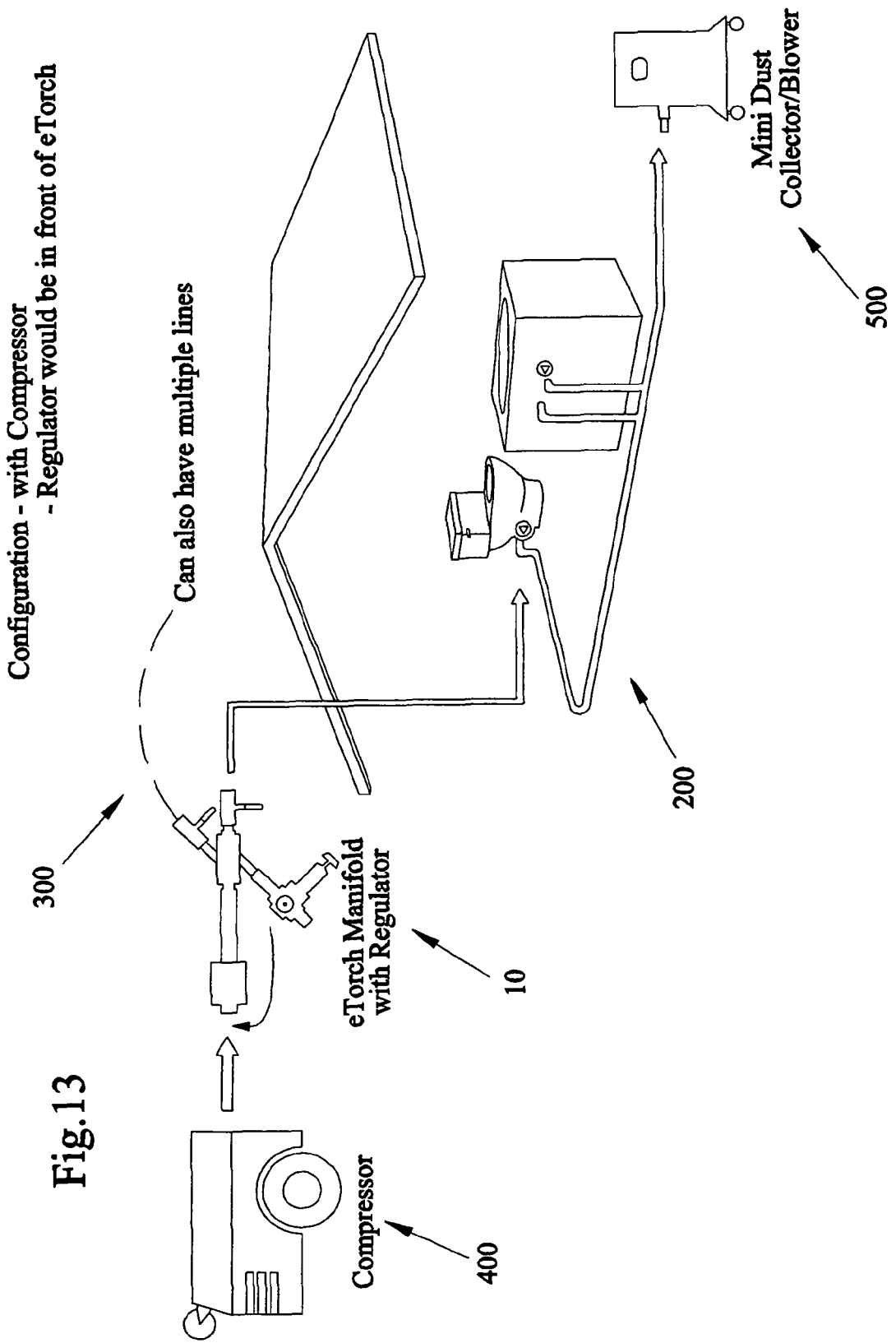
FIG. 13 shows a configuration setup of the portable heater invention used with a compressor at one end of a piping system and a collector/blower at an opposite end.

FIG. 13 shows a configuration setup 300 of the portable heater invention apparatus 10 used with a compressor 400 at one end of a piping system 200 and a collector/blower 500 at an opposite end of the piping system.

The compressor 400 can be attached to an compressed air (CA) inlet end of the apparatus 10 shown in FIGS. 9-11, and the mini-dust collector/blower 500 can be used on the outlet end of the piping system 200. Although one outlet end on the manifold is shown attached to the piping system, the outer outlet end can be attached to other pipe(s) in the piping system. Similarly, the mini-dust collector/blower 500 can be attached to more than one outlet end of the piping system.

The compressor 400 can be a compressor that can provide compressed air up to approximately 200 CFM and up to approximately 200 PSI, and can include compressor components such as those described in the parent inventions to the subject invention, such as U.S. patent application Ser. No. 11/246,825 filed Oct. 7, 2005, now U.S. Pat. No. 7,517,409, which was a divisional application of U.S. patent application Ser. No. 10/649,288 filed Aug. 23, 2003, now U.S. Pat. No. 7,160,574, which are both incorporated by reference. The air compressors 100 can provide filtered compressed air.

The filtered compressed air employed in various quantities can be used, to dry the interior of the piping system, by itself. Alternatively, the compressor can be used to move air as a propellant to drive abrasive material used in cleaning of the piping system. Additionally, the compressor can be used as the propellant in the application of the epoxy barrier coating and the drying of the epoxy barrier coating once it has been applied. The compressors also provide compressed air used to propel ancillary air driven equipment.

The collector/blower 500 can be a vacuum generating mini-dust collector/blower, such as the air filter Manufactured By: Media Blast & Abrasives, Inc. 591 W. Apollo Street, Brea, Calif. 92821, and vacuum generating collector/blower shown and described in reference to components such as those described in the parent inventions to the subject invention, such as U.S. patent application Ser. No. 11/246,825 filed Oct. 7, 2005, now U.S. Pat. No. 7,517,409, which was a divisional application of U.S. patent application Ser. No. 10/649,288 filed Aug. 23, 2003, now U.S. Pat. No. 7,160,574, which are both incorporated by reference.

During a pipe profiling stage, mini dust collector/blower 500 can be the final stage of the air filtration process. The dust collector/blower 500 can filter the passing air of fine dust and debris from the piping system 200 after the contaminated air first passes. During the epoxy coating drying stage the dust collector/blower 500 can be used to draw air through the piping system 200, keeping a flow of air running over the epoxy and enhancing its drying characteristics. The dust collector/blower 500 creates a vacuum in the piping system 200 which is used as method of checking for airflow in the piping system. The dust collector/blower 500 can be capable of filtering air in volumes up to approximately 200 CFM.

There are many novel parts and benefits to the dust collector/blower 500. The air filter has portability and is easy to move and maneuver in tight working environments.

The collector/blower 500 can be used on common household electrical currents while still being able to maintain its capacity to filter up to approximately 200 CFM of air. The dust collector/blower 50 can keep a flow of air running over the epoxy and enhancing its drying and curing characteristics. The dust collector/blower 500 creates a vacuum in the piping system, which is used as method of checking for airflow in the piping system.

Figure 14:
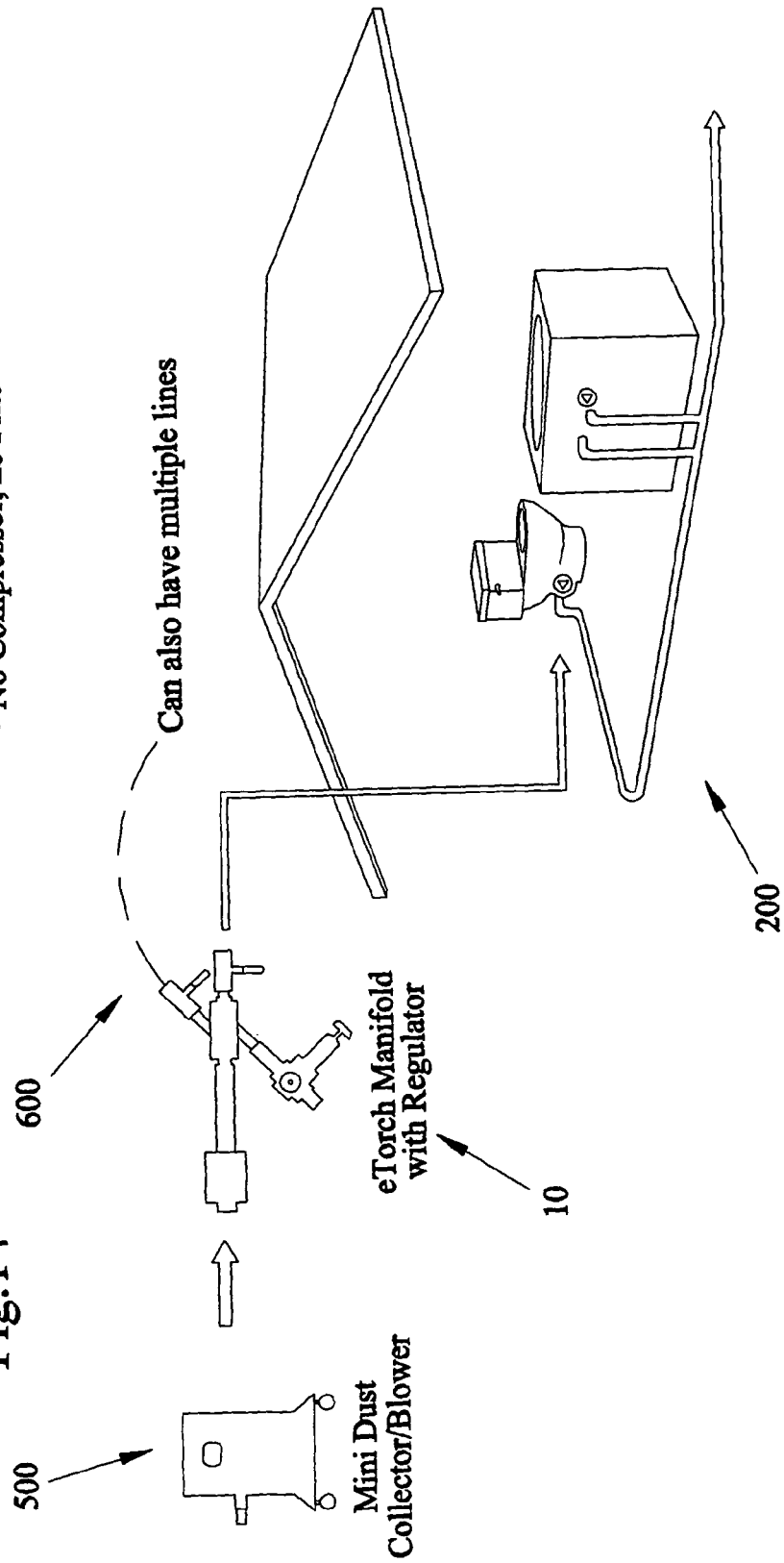
FIG. 14 shows another configuration setup with a blower pushing air through the portable heater invention into a piping system.

FIG. 14 shows another configuration setup 600 with a dust collector/blower 500 being used for pushing air through the portable heater invention apparatus 10 into an inlet end of the piping system 200. Here, no compressor 400 is needed. Additionally, the filter part of the collector/blower 500 is not needed as well. The dust collector/blower 500 can be attached to an compressed air (CA) inlet end of apparatus 10 shown in FIGS. 9-11. The outlet end of the manifold 80 of the invention apparatus 10 can also have multiple lines attached to inlets of the piping system 200.

Figure 15:
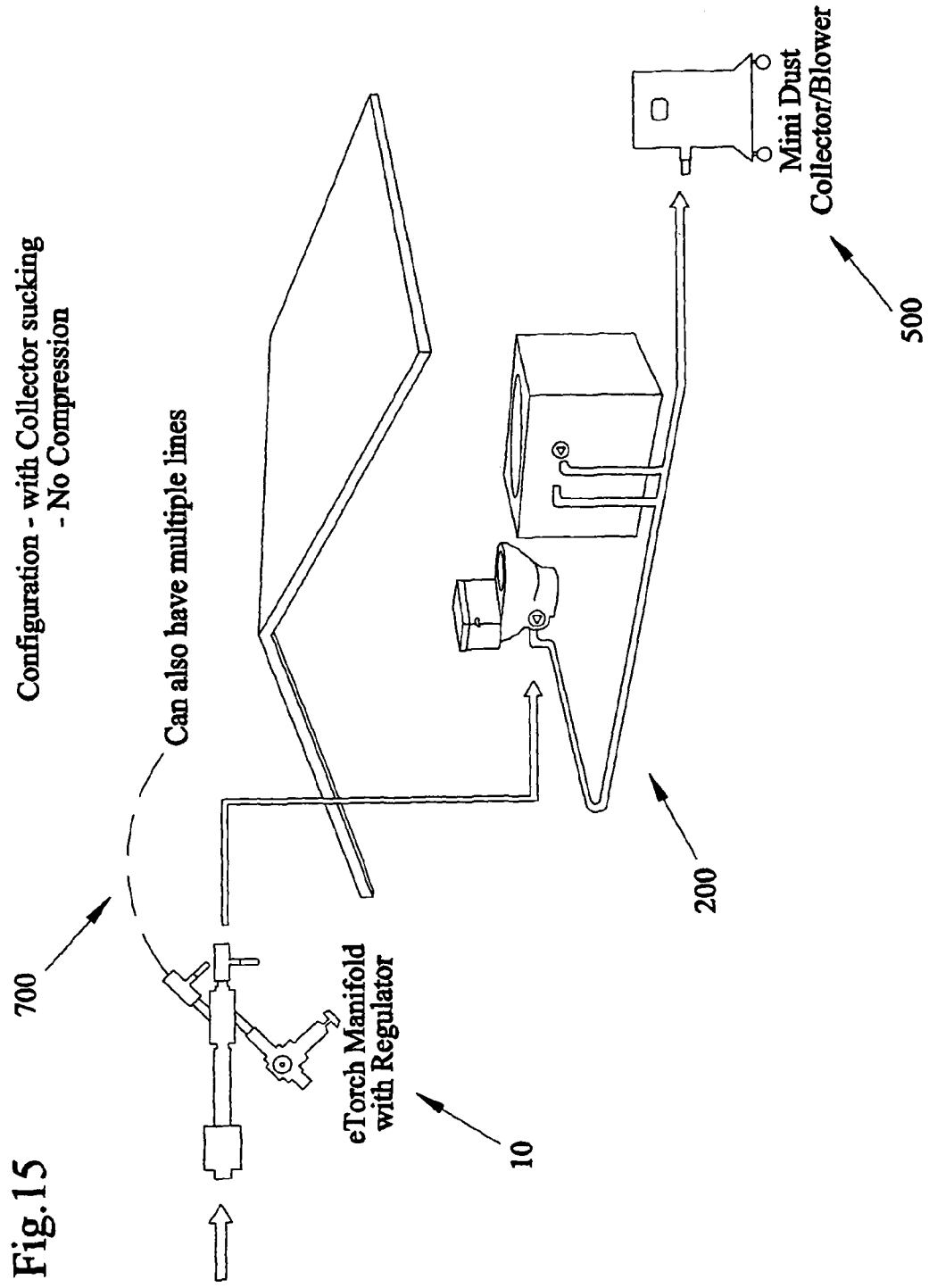
FIG. 15 shows another configuration setup with a collector sucking air at an opposite end of the piping system from the portable heater invention.

FIG. 15 shows another configuration setup 700 with a collector 500 forming a vacuum for sucking air at an opposite end of the piping system 200 from the portable heater invention apparatus 10. Here, no compressor 400 is needed, and the apparatus configuration 10 of FIG. 12 can be used. Similarly, the outlet end of the manifold 80 of the invention apparatus 10 can also have multiple lines attached to inlets of the piping system 200. Additionally, the collector/blower 500 can be attached to other outlets of the piping system 200.

Figure 16:
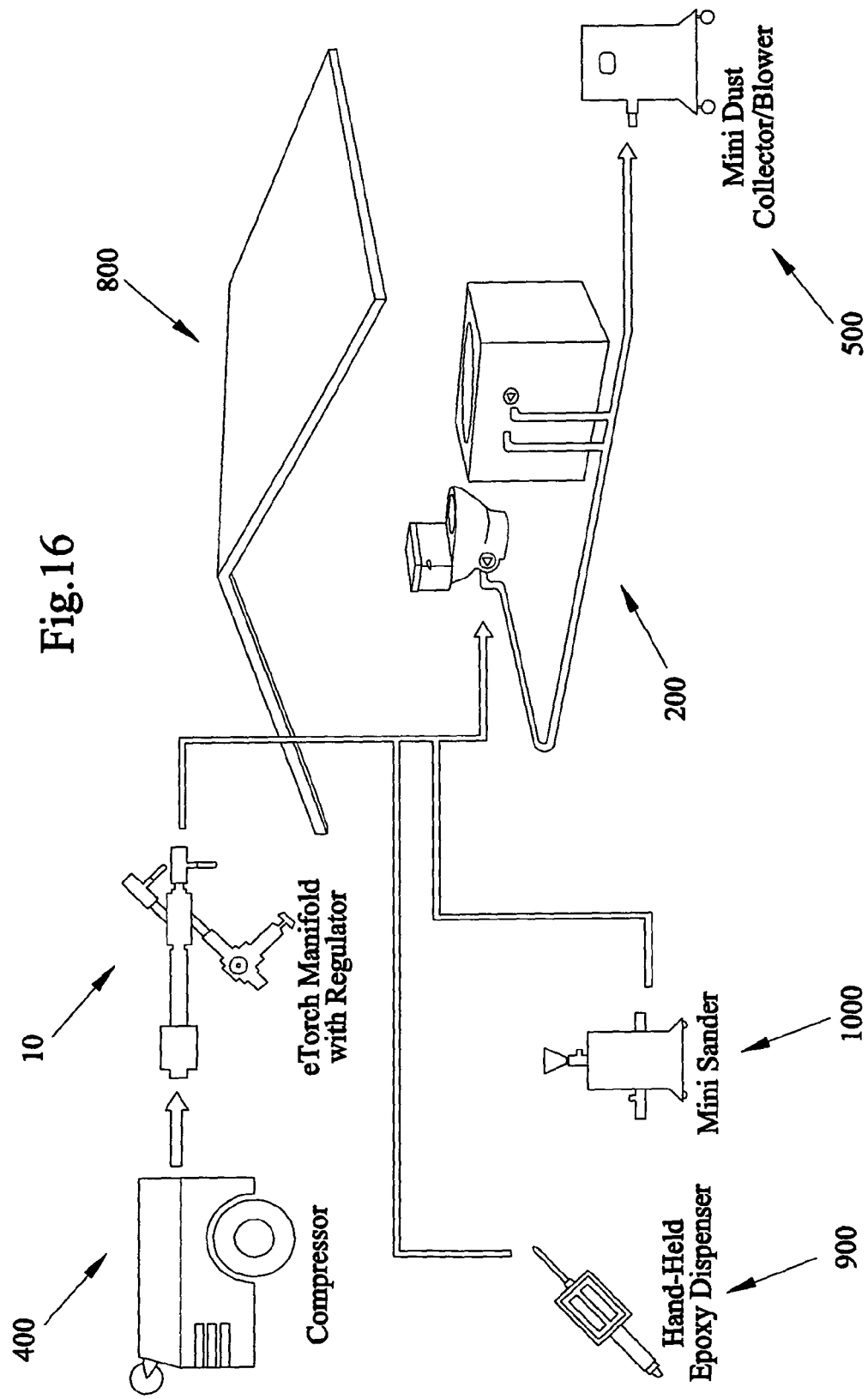
FIG. 16 shows another configuration setup using the setup of FIG. 13 with a hand-held epoxy dispenser and mini sander.

FIG. 16 shows another configuration setup 800 using the setup of FIG. 13 with a hand-held epoxy dispenser 900 and mini sander 1000. An example of a handheld dispenser 900 can include but is not limited to hand held dispensers available from: COX North America, Inc. 8181 Coleman Road, Haslett, Mich. 48840 USA. An example of a mini sander 1000 can include but is not limited to a mini sander manufactured by Media Blast and Abrasives, Inc. 591 W. Apollo St., Brea, Calif. 92821.

The novel portable heating unit 10 was invented partially in view of the 2008 fuel prices hitting record highs, in order to:
1) reduce our dependency on running the compressor which is reliant on expensive fuels
2) how to speed up the drying process and
3) use a common on site power source: household electricity i.e. will work on a North American 110-120V, 60 Hz, 15 amp service and has been adapted to European circuit 220-240 V, 50 Hz 15 amp service
4) create more heat as unit is situated close proximity to the piping section
5) give the operator greater flexibility on the control of heat using a combination the following variables:
   a) adjustable heat source, i.e.: rheostat, (50)
   b) control of air pressure, with regulator (180 and 190)
   c) control of air flow, with use of valves (120)

d) location of heating devise. We can place the novel apparatus setup at or very near the pipe end and often right in the room f) controlling air flow on multiple outlets (90 and 140) or combinations of above on multiple outlets using a combination of air flow via valves, regulating temperature for each connection i.e. pipe section via use of regulator for control of air pressure, airflow control via valves and unit heat source control via rheostat.

6) In testing, the portable heating unit is able to continue drying the pipe or epoxy and move the compressor off to another section or job while the drying continued using novel apparatus with a non compressor dependant vacuum or blower. The invention is able to achieve, greater heat, and greater flexibility of use which significantly reduced drying and cure time, reduced dependence on the use of the compressor, complete work on multiple sections at a single time.

7) The novel portable heating unit can be used with blower air or pulling air i.e.: with a vacuum or both (another distinctive feature)

The invention has novel results in the areas of heat improvement, effects on barrier coating cure rates, and operator flexibility.

Examples of Heat Improvement

Table 1 shows various examples of heat improvement using the novel portable heating unit 10.

TABLE 1

Electrical input 1500 Watts, Temp increase shown is increase over incoming air temperature

| | CFM | | | | | |
|---|---|---|---|---|---|---|
| | 10 | 20 | 60 | 80 | 100 | 115 |
| Temp Increase ° F. | 450 | 225 | 75 | 56 | 45 | 39 |

Note:
owing to safety and general application factors it is not likely to apply temperatures of over approximately 160° F. Typically with the novel portable heater we can set up to achieve an operating temperature of up to approximately 160° F.

A problem with using the type of heat source at the compressor is the so-called standard heater is based on moving higher volumes of CFM through the heater in the compressor. As referred above, a compressor is often used to also blow an epoxy through a piping system in order to coat the insides of the pipes. Once the epoxy is placed inside the pipe it is not ideal to run high volumes of air through the pipes, since this can result in overblowing the epoxy making it thin out. The volume of moving air in conventional heaters running on compressors is required to keep up the heat. The novel portable heater is able to achieve higher temperatures using lower CFM which permits less or no use of the compressor and gives the operator faster cure times by achieving higher air temperatures and better control over maintaining the epoxy at its desired thickness inside the pipe. Table 1 shows these novel results.

Effect on Barrier Coating Cure Rates

The invention has had a positive effect on barrier coating cure rates. The invention has been able to reduce a 24 hour rated barrier coating when rated to cure at room temp i.e. approximately 75° F. (approximately 25° C.) to less than 2 hours with the novel portable heater on single or multiple piping sections. Application of heat to coatings is not new or novel by any means. Table 2 shows the effects that have been achieved using the novel portable heater.

TABLE 2

| | CFM | | | | | |
|---|---|---|---|---|---|---|
| | 10 | 20 | 60 | 80 | 100 | 115 |
| Temp Increase ° F. | 450 | 225 | 75 | 56 | 45 | 39 |
| Curing Time (approx) | <10 min | <10 min | 1 hr | 3 hrs | 3.5 hrs | 4 hrs |

Operator Flexibility

The invention allows for controlling air flow on multiple outlets or combinations of above on multiple outlets using a combination of air flow via valves, regulating temperature for each connection i.e. pipe section via use of regulator for control of air pressure, airflow control via valves and unit heat source control via rheostat. The operator can place the novel portable heater unit in a room, on a floor for example and the heat of the unit is dissipated through the specially designed heat dissipater legs 130A, 130B which allow the heat to dissipate to safe levels at the base of the legs 130A, 130B.

Heat Dissipating Legs 130A, 130B include legs 130A located under the Controller 30 and legs 130B are the legs located under the Air Distribution Manifold 80. Table 3 shows the temperatures of the heat dissipating legs 130A, 130B with the outlet air temperatures from the Manifold 80.

TABLE 3

| | Manifold 80 Outlet Air Temp degrees F. | | | | | |
|---|---|---|---|---|---|---|
| | 109 | 114 | 127 | 140 | 154 | 167 |
| Temp Leg 130A degrees F. | 78 | 78 | 80 | 80 | 80 | 80 |
| Temp Leg 130B degrees F. | 89 | 91 | 110 | 114 | 120 | 121 |

In a preferred embodiment Leg 130A can be stainless steel, and has been built with a thickness of approximately 0.058" (expressed in $1000^{th}$ of an inch) Leg 103B can be powder coated black steel thickness of approximately 0.130" Air Distribution Manifold 80 can be powder coated black steel, having a thickness of approximately 0.203" and a diameter of approximately 2.5".

Ideal Piping Sizes Using the Described Invention and Other Data

Given the wattages and air flow described the invention described is ideally suited for pipes up to approximately 2" in diameter. The invention can be used with pipes that can be metallic or non metallic. Pipes may be used to carry water, natural gas, other fluids such as water used in heating systems, pipes may be pressurized or non pressurized types. Multiple pipe sections of various sizes may be heated at the same time using the invention. The invention relies on outside sources of air movement that is outside the device. There is no blower or vacuum contained within the unit. Adjustment to the wattage and size of the heating unit would allow an operator to heat larger diameter pipes i.e.: larger than approximately 2".

While a preferred embodiment of the invention has described the quick disconnect air fittings having opposing clamp edges and protruding portions, types of other fittings that can be used are called "lug" type fittings, which can have 2 or more lugs that mate by interlocking. Such fittings have also been referenced under names that include Air King, Crows foot, Universal and Chicago fittings. Additionally, other types of quick disconnect fittings can be used such as Cam Locks, where a male or female coupler is joined to a male or female adapter, they are held together with a locking device on the coupler that fits into the adapter. Other disconnects may work with this invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A portable heating apparatus for heating interior surfaces of piping systems before the piping systems are coated, comprising:
    a portable heating chamber with a heating element having a single inlet end for directing air into the chamber and a single outlet end for emitting heated air therefrom, the chamber providing only a single path of air flow between the single inlet end and the single outlet end;
    a manifold having a first inlet end a second inlet end for drawing air therethrough, the manifold having a first outlet end and a second outlet end for passing air therefrom, at least one of the first inlet end and the second inlet end being attached to the outlet end of the heating chamber, and wherein at least one of the first outlet end and the second outlet end being attached to an end of a piping system;
    operator controls that are selected from at least one of: an adjustable heater control for operating and controlling temperature of the heating element in the heating chamber, an adjustable air pressure control for controlling air pressure through the manifold, and an adjustable air flow control for controlling air flow through the manifold, the air flow control including
    an outlet valve for opening and closing at least one of the first outlet end and the second outlet end of the manifold, wherein the heating apparatus is useful before the piping systems are coated.

2. The portable heating apparatus of claim 1, wherein the outlet valve of the airflow control includes:
    a first shut-off valve for opening and closing the first outlet end of the manifold;
    a first handle for operating the first shut-off valve;
    a second shut-off valve for opening and closing the second outlet end of the manifold; and
    a second handle for operating the second shut-off valve.

3. The portable heating apparatus of claim 1, further comprising:
    heat dissipating legs attached to at least one of the heating chamber and the manifold, for dissipating heat therefrom.

4. The portable heating apparatus of claim 3, wherein the heat dissipating legs include:
    heater heat dissipating legs attached directly to the heater for dissipating heat from the heater chamber; and
    manifold heat dissipating legs attached directly to the manifold for dissipating heat from the manifold.

5. The portable heating apparatus of claim 1, further comprising:
    quick disconnect fittings attached to the inlet end of the heating chamber, and attached to at least one of the first inlet end and the second inlet end of the manifold, and attached to at least one of the first outlet end and the second outlet end of the manifold, each quick disconnect fitting having opposing clamp edges and protruding portions between the clamp edges, wherein each quick disconnect fitting lockably attaches to another quick disconnect fitting by rotating the clamp edges of each fitting about the protruding portions of each fitting.

6. The portable heating apparatus of claim 1, wherein the adjustable air pressure control includes:
    a mechanically actuated air regulator having an air inlet end and an air outlet end, the outlet end being attached to the inlet end to the heating chamber, the air regulator for regulating air pressure between zero up to 200CFM and between zero and 200PSI.

7. The portable heating apparatus of claim 1, wherein the adjustable air pressure control includes:
    a mechanically actuated air regulator having an air inlet end and an air outlet end, the outlet end being attached to one of the first inlet end and the second inlet end of the manifold, the air regulator for regulating air pressure between zero up to 200CFM and between zero and 200PSI.

8. The portable heating apparatus of claim 1, wherein the adjustable air pressure control includes:
    a mechanically actuated air regulator having an air inlet end and an air outlet end, the outlet end being attached to one of the first outlet end and the second outlet end of the manifold, the air regulator for regulating air pressure between zero up to 200CFM and between zero and 200PSI.

9. A method of using a portable heating unit, comprising the steps of:
    providing a portable heating chamber with a heating element having a single inlet end for directing air into the chamber and a single outlet end;
    providing only a single path of air flow between the single inlet end and the single outlet end of the chamber;
    providing a manifold having a first inlet end a second inlet end, and a first outlet end and a second outlet end;
    attaching at least one of the first inlet end and the second inlet end to the outlet end of the heating chamber;
    attaching at least one of the first outlet end and the second outlet end of the manifold to an inlet of a piping system;
    generating heated air from the outlet end of the heating chamber;
    passing the heated air from one of the first outlet end and the second outlet end of the manifold into the inlet of the piping system; and
    adjustable controlling operating parameters of the portable heating apparatus selected from at least one of: controlling and adjusting temperature of the heated air with an adjustable temperature control, controlling and adjusting air pressure through the manifold with an adjustable air pressure control, and controlling and adjusting air flow through the manifold with an adjustable air flow control;
    heating interior surfaces of the piping system before the interior surfaces are coated.

10. The method of claim 9, further comprising the step of:
    dissipating external heat from the heating chamber and from the manifold.

11. The method of claim 9, wherein the step of controlling and adjusting air pressure includes the step of:
    regulating air pressure into the inlet end to the heating chamber between zero up to 200CFM and between zero and 200PSI.

12. The method of claim 9, wherein the step of controlling and adjusting air pressure includes:
    regulating air pressure into at least one of the first inlet end and the second inlet end of the manifold between zero up to 200CFM and between zero and 200PSI.

13. The method of claim 9, wherein the step of controlling and adjusting air pressure includes:

regulating air pressure into one of the first outlet end and the second outlet end of the manifold between zero up to 200CFM and between zero and 200PSI.

14. The method of claim 9, further comprising the steps of:

generating compressed air from a compressor into at least one of the first inlet end and the second inlet end of the manifold; and forming a vacuum with a blower to pull air from at least one of the first outlet end and the second outlet end of the manifold.

15. The method of claim 10, further comprising the steps of:

dispensing a liquid coating into an inlet of the piping system; and generating a sand emission into another inlet of the piping system.

16. A portable heater unit for heating interior surfaces of a piping system, before the piping system is coated, comprising:

a portable heating chamber with a heating element having a single inlet end for directing air into the chamber and a single outlet end for emitting heated air therefrom, the chamber for providing only a single path of air flow between the single inlet end and the single outlet end;

a manifold having a first inlet end a second inlet end for drawing air therethrough, the manifold having a first outlet end and a second outlet end for passing air therefrom, at least one of the first inlet end and the second inlet end being attached to the outlet end of the heating chamber, and wherein at least one of the first outlet end and the second outlet end being attached to an end of a piping system;

operator controls that are selected from at least one of: an adjustable heater control for operating and controlling temperature of the heating element in the heating chamber, an adjustable air pressure control for controlling air pressure through the manifold, and an adjustable air flow control for controlling air flow through the manifold, the adjustable heater control including a heater control valve for operating and controlling temperature of the heating element in the heating chamber, the adjustable air pressure control including an air pressure regulator for regulating air pressure, the adjustable air flow control including a first shut-off valve for opening and closing the first outlet end of the manifold, a first handle for operating the first shut-off valve, a second shut-off valve for opening and closing the second outlet end of the manifold, a second handle for operating the second shut-off valve;

heat dissipating legs attached to the heater for dissipating heat from the heater chamber;

additional heat dissipating legs attached directly to the manifold for dissipating heat from the manifold; and quick disconnect fittings attached to the inlet end of the heating chamber, and attached to at least one of the first inlet end and the second inlet end of the manifold, and attached to at least one of the first outlet end and the second outlet end of the manifold, each quick disconnect fitting having opposing clamp edges and protruding portions between the clamp edges, wherein each quick disconnect fitting lockably attaches to another quick disconnect fitting by rotating the clamp edges of each fitting about the protruding portions of each fitting, wherein the heating unit is useful before the interior surfaces of the piping system are coated.

\* \* \* \* \*